United States Patent
Zheng et al.

(10) Patent No.: US 9,203,545 B2
(45) Date of Patent: Dec. 1, 2015

(54) METHOD, DEVICE, AND NESTED SYSTEM FOR ALLOCATING UPLINK AND DOWNLINK BANDWIDTH

(71) Applicant: Huawei Technologies Co., Ltd., Shenzhen (CN)

(72) Inventors: Ruobin Zheng, Shenzhen (CN); Xue Chen, Beijing (CN); Xintian Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/316,506

(22) Filed: Jun. 26, 2014

(65) Prior Publication Data

US 2014/0308038 A1   Oct. 16, 2014

Related U.S. Application Data

(63) Continuation of application No. PCT/CN2012/083370, filed on Oct. 23, 2012.

(30) Foreign Application Priority Data

Feb. 29, 2012   (CN) .......................... 2012 1 0050112

(51) Int. Cl.
*H04J 14/08* (2006.01)
*H04B 10/27* (2013.01)
(Continued)

(52) U.S. Cl.
CPC ............... *H04J 14/08* (2013.01); *H04B 10/27* (2013.01); *H04J 3/1694* (2013.01); *H04Q 11/0067* (2013.01); *H04Q 2011/0064* (2013.01)

(58) Field of Classification Search
CPC ... H04J 14/02; H04J 14/0212; H04J 14/0213; H04J 14/0217; H04J 14/0256; H04J 14/0298
See application file for complete search history.

(56) References Cited

U.S. PATENT DOCUMENTS 6,895,185 B1 * 5/2005 Chung et al. ..................... 398/72
2003/0095568 A1   5/2003 Tominaga et al.
(Continued)

FOREIGN PATENT DOCUMENTS

CN   1420657   5/2003
CN   1855778   11/2006
(Continued)

OTHER PUBLICATIONS

ITU-T Telecommunication Standardization Sector of ITU, "Series G: Transmission Systems and Media, Digital Systems and Networks, Digital Sections and Digital Line System—Optical Line Systems for Local and Access Networks; Gigabit-Capable Passive Optical Networks (G-PON): Transmission Convergence Layer Specification", G.984.3, International Telecommunication Union, Mar. 2008, 146 pages.

(Continued)

*Primary Examiner* — David Payne
*Assistant Examiner* — Casey Kretzer
(74) *Attorney, Agent, or Firm* — Slater & Matsil, L.L.P.

(57) ABSTRACT

A method for allocating uplink and downlink bandwidth, includes: receiving, by a primary ONU, a primary PON downlink frame sent by a nested OLT, where the primary PON downlink frame carries a primary ONU uplink bandwidth grant and a secondary ONU uplink bandwidth grant; parsing, by the primary ONU, the primary PON downlink frame to acquire the primary ONU uplink bandwidth grant and the secondary ONU uplink bandwidth grant; and sending, by the primary ONU, a secondary PON downlink frame to a secondary ONU, where the secondary PON downlink frame carries the acquired secondary ONU uplink bandwidth grant. The present disclosure achieves an optimal overall performance for the two stages of PONs by considering general conditions of the two stages of PONs, and meanwhile ensures a maximum available bandwidth for the two stages of PONs during formulation of bandwidth grants.

4 Claims, 15 Drawing Sheets

(51) Int. Cl.
*H04J 3/16* (2006.01)
*H04Q 11/00* (2006.01)

(56) References Cited

U.S. PATENT DOCUMENTS

| | | | |
|---|---|---|---|
| 2007/0189771 A1* | 8/2007 | Kim | 398/69 |
| 2010/0178051 A1 | 7/2010 | Mizutani et al. | |
| 2010/0232794 A1 | 9/2010 | Zheng | |
| 2010/0290783 A1* | 11/2010 | Kazawa et al. | 398/66 |
| 2012/0121265 A1* | 5/2012 | Suvakovic et al. | 398/66 |
| 2013/0230326 A1 | 9/2013 | Hu et al. | |

FOREIGN PATENT DOCUMENTS

| | | |
|---|---|---|
| CN | 101459656 | 6/2009 |
| CN | 102131131 A | 7/2011 |
| CN | 102142898 | 8/2011 |
| EP | 2017987 A1 | 1/2009 |
| JP | 2010161672 A | 7/2010 |
| JP | 4854823 B1 | 1/2012 |
| JP | 2012080401 A | 4/2012 |

OTHER PUBLICATIONS

Huawei Technologies, "A Nested PON Architecture," International Telecommunication Union, Telecommunication Standardization Sector, Study Group 15—Contribution 708, COM 15-C 708-E, Sep. 2009, 4 pages.

Mizuguchi et al., "Examination in Optical Consolidating PON System," Information and Communication Engineers Technical Report, Feb. 24, 2011, vol. 110, No. 441, pp. 109-112.

* cited by examiner

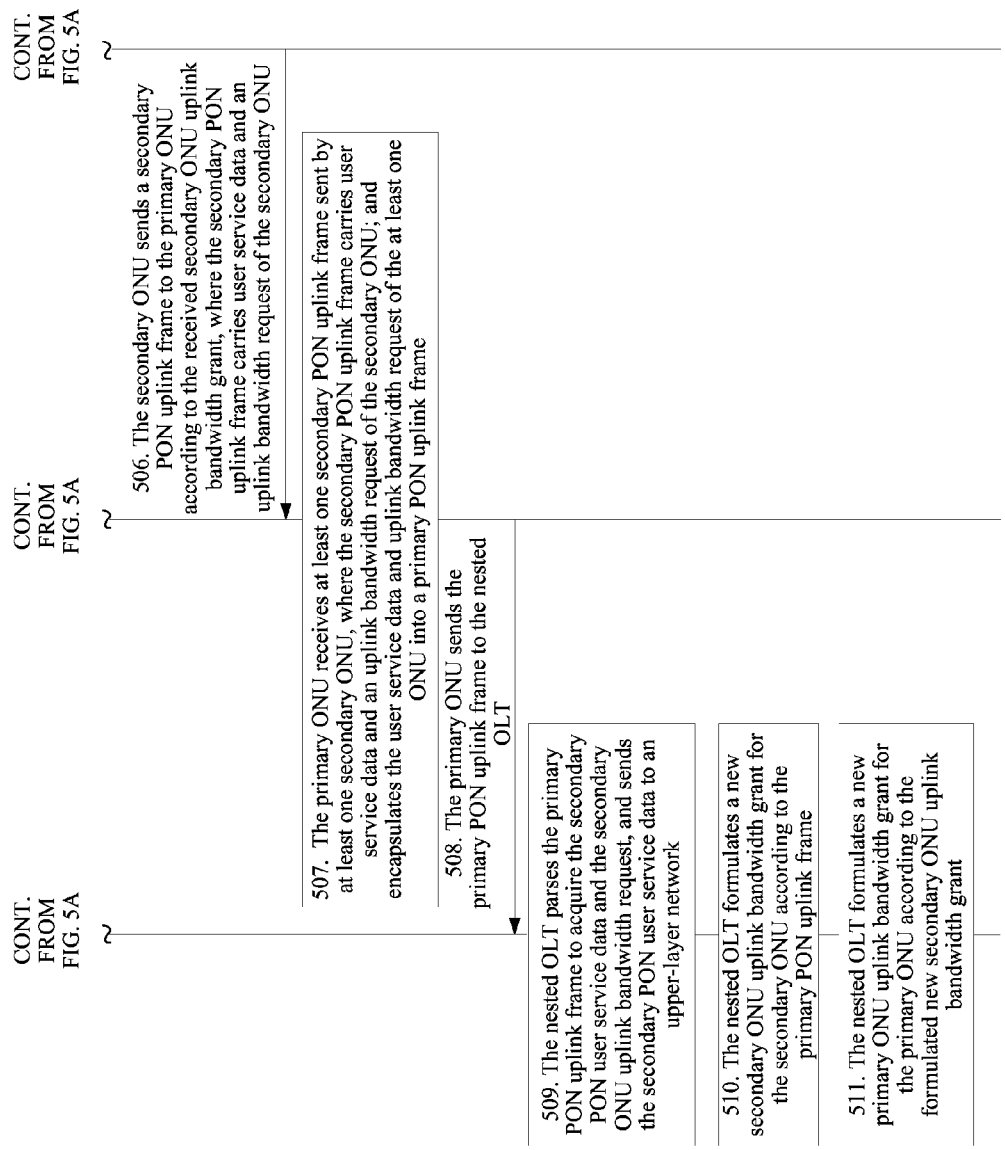

A nested OLT formulates a primary ONU downlink bandwidth grant, an sends a primary PON downlink frame to a primary ONU according to the primary ONU downlink bandwidth grant, where the primary PON downlink frame carries secondary PON downlink user service data, primary PON overhead, and secondary PON overhead, so that the primary ONU parses the primary PON downlink frame to acquire the secondary PON downlink user service data, the primary PON overhead, and the secondary PON overhead ⟶ 601

FIG. 6

A primary ONU receives a primary PON downlink frame sent by a nested OLT, where the primary PON downlink frame carries secondary PON downlink user service data, primary PON overload, and secondary PON overhead ⟶ 701

↓

The primary ONU parses the primary PON downlink frame to acquire the secondary PON downlink user service data, the primary PON overhead, and the secondary PON overhead ⟶ 702

↓

The primary ONU sends a secondary PON downlink frame to a secondary ONU, where the secondary PON downlink frame carries the secondary PON downlink user service data and the secondary PON overhead ⟶ 703

FIG. 7

METHOD, DEVICE, AND NESTED SYSTEM FOR ALLOCATING UPLINK AND DOWNLINK BANDWIDTH

CROSS-REFERENCE TO RELATED APPLICATIONS

This application is a continuation of International Application No. PCT/CN2012/083370, filed on Oct. 23, 2012, which claims priority to Chinese Patent Application No. 201210050112.9, filed on Feb. 29, 2012, both of which are hereby incorporated by reference in their entireties.

TECHNICAL FIELD

The present disclosure relates to the field of optical networks, and in particular, to a method, a device, and a nested system for allocating uplink and downlink bandwidth used in a nested passive optical network.

BACKGROUND

With increase of the number of users and emergence of demand for high bandwidth, in one to five years, currently deployed access networks such as GPON (Gigabit-capable Passive Optical Network, gigabit-capable passive optical network) and EPON (Ethernet Passive Optical Network, Ethernet passive optical network) will have to be upgraded to PON (Passive Optical Network, passive optical network) networks having larger capacities. However, considering the investment and fixed assets placed in deployment of such access network as GPON and EPON, for sake of return on the current investment and increase of the coverage and transmission capacity of the access network, a nested TDM (Time-division Multiplexing, time-division multiplexing) PON may be employed.

With respect to the current PON, for example, GPON, dynamic bandwidth allocation refers to a process that an ONU (Optical Network Unit, optical network unit) and a correlated T-CONT (Transmission Container, transmission container) directly or indirectly request uplink bandwidth dynamically; and, arranges bandwidth according to the real-time state of the ONU, and dynamically adjusts the bandwidth value granted to the ONU in the manner that an OLT monitors idle frames or the ONU reports real-time state of uplink service traffic to the OLT (Optical Line Terminal, optical line terminal device). In this way, the manner of allocating ONU uplink bandwidth by the OLT not only ensures that uplink services of various ONUs are not subject to conflicts, but also fully utilizes bandwidth resources.

During the state report-based dynamic bandwidth allocation, both the real-time state of the traffic reported by the ONU and the uplink bandwidth allocation by the OLT use the transmission container T-CONT as granularity. Each T-CONT may be considered as a logical cache, and each logical cache stores user service data having similar QoS requirements. With respect to each T-CONT of the ONU, a dynamic bandwidth allocation function module of the OLT collects in-band uplink dynamic bandwidth reports, determines occupancy of the T-CONT, and acquires the real-time state of the uplink service traffic. The OLT generates a bandwidth mapping table according to the occupancy, available bandwidth resources, and agreement signed with a user. The bandwidth mapping table is transmitted to the ONU by means of downlink in-band transmission, to provide guidance for the ONU to implement uplink transmission.

During the implementation of the present disclosure, it is found that the prior art has at least the following problems:

The conventional bandwidth allocating methods are directed to a single-stage PON network, and therefore optimal quality of service is assured for the user service data in the single-stage PON. However, a nested PON has two stages of PON network structures, and optimal quality of service in each single-stage PON may not ensure that the overall quality of service in the two-stage PON network is optimal. This is because the data on which importance is placed in one stage of PON, especially the service data having a lower priority, may not be attached with importance in another stage of PON, and may even be discarded. As a result, the importance placed by the previous stage of PON is of no significance, and therefore the overall quality of service deteriorates.

SUMMARY

Embodiments of the present disclosure provide a method, a device, and a nested system for allocating uplink and downlink bandwidth in a passive optical network.

According to an aspect of the embodiments of the present disclosure, a method for allocating uplink bandwidth in a nested passive optical network includes:

receiving, by a primary optical network unit ONU, a primary PON downlink frame sent by a nested optical line terminal device OLT, where the primary PON downlink frame carries a primary ONU uplink bandwidth grant and a secondary ONU uplink bandwidth grant;

parsing, by the primary ONU, the primary PON downlink frame to acquire the primary ONU uplink bandwidth grant and the secondary ONU uplink bandwidth grant; and sending, by the primary ONU, a secondary PON downlink frame to a secondary ONU, where the secondary PON downlink frame carries the acquired secondary ONU uplink bandwidth grant.

According to another aspect of the embodiments of the present disclosure, a method for allocating uplink bandwidth in a nested passive optical network includes:

receiving, by a secondary optical network unit ONU, a secondary PON downlink frame sent by a primary ONU, where the secondary PON downlink frame carries a secondary ONU uplink bandwidth grant; and sending, by the secondary ONU, a secondary PON uplink frame to the primary ONU according to the received secondary ONU uplink bandwidth grant, where the secondary PON uplink frame carries the received secondary ONU uplink bandwidth granted.

According to another aspect of the embodiments of the present disclosure, a method for allocating uplink bandwidth in a nested passive optical network includes:

sending, by a nested optical line terminal device OLT, a primary PON downlink frame to a primary optical network unit ONU, where the primary PON downlink frame carries a primary ONU uplink bandwidth grant and a secondary ONU uplink bandwidth grant;

receiving, by the nested OLT, a primary PON uplink frame sent by the primary ONU;

formulating, by the nested OLT, a new secondary ONU uplink bandwidth grant for the secondary ONU according to the primary PON uplink frame; and formulating, by the nested OLT, a new primary ONU uplink bandwidth grant for the primary ONU according to the new secondary ONU uplink bandwidth grant formulated for the secondary ONU.

According to another aspect of the embodiments of the present disclosure, a method for allocating downlink bandwidth in a nested passive optical network includes:

formulating, by a nested optical line terminal device OLT, a primary ONU downlink bandwidth grant, sending a primary PON downlink frame to a primary optical network unit ONU according to the primary ONU downlink bandwidth grant, where the primary PON downlink frame carries secondary PON downlink user service data, primary PON overhead, and secondary PON overhead, so that the primary ONU parses the primary PON downlink frame to acquire the secondary PON downlink user service data, the primary PON overhead, and the secondary PON overhead.

According to another aspect of the embodiments of the present disclosure, a method for allocating downlink bandwidth in a nested passive optical network includes:

receiving, by a primary optical network unit ONU, a primary PON downlink frame sent by a nested optical line terminal device OLT, where the primary PON downlink frame carries secondary PON downlink user service data, primary PON overload, and secondary PON overhead;

parsing the primary PON downlink frame to acquire the secondary PON downlink user service data, the primary PON overhead, and the secondary PON overhead; and sending, by the primary ONU, a secondary PON downlink frame to a secondary ONU, where the secondary PON downlink frame carries the secondary PON downlink user service data and the secondary PON overhead.

According to another aspect of the embodiments of the present disclosure, a method for allocating uplink bandwidth in a nested passive optical network includes:

receiving, by a primary optical network unit ONU, a primary PON downlink frame sent by a nested optical line terminal device OLT, and sending a secondary PON downlink frame to a secondary ONU, where the primary PON downlink frame carries a primary ONU uplink bandwidth grant and the secondary PON downlink frame carries a secondary ONU uplink bandwidth grant;

parsing, by the primary ONU, the primary PON downlink frame to acquire the primary ONU uplink bandwidth grant;

receiving, by the primary ONU, primary PON uplink user service data;

receiving, by the primary ONU, a secondary PON uplink frame sent by a secondary ONU, where the secondary PON uplink frame carries secondary PON uplink user service data, secondary ONU uplink bandwidth request, and secondary PON overhead;

parsing, by the primary ONU, the secondary PON uplink frame to acquire the secondary PON uplink user service data, the secondary ONU uplink bandwidth request, and the secondary PON overhead, and formulating a new secondary ONU uplink bandwidth grant for the secondary ONU according to the acquired secondary ONU uplink bandwidth request; and sending, by the primary ONU, a primary PON uplink frame to the nested OLT, where the primary PON uplink frame carries the primary PON uplink user service data, primary ONU uplink bandwidth request, the secondary PON uplink user service data, and the secondary PON overhead, so that the nested OLT parses the primary PON uplink frame to acquire the primary PON uplink user service data, the primary ONU uplink bandwidth request, the secondary PON uplink user service data, and the secondary PON overhead, thereby formulating a new primary ONU uplink bandwidth grant for the primary ONU.

According to another aspect of the embodiments of the present disclosure, a method for allocating downlink bandwidth in a nested passive optical network includes:

receiving, by a primary optical network unit ONU, a primary PON downlink frame from a nested optical line terminal device OLT, where the primary PON downlink frame carries primary PON downlink user service data, secondary PON user service data, primary PON overhead, and secondary PON overhead;

parsing, by the primary ONU, the primary PON downlink frame to acquire the primary PON user service data, the secondary PON user service data, the primary PON overhead, and the secondary PON overhead;

delivering, by the primary ONU, the primary PON user service data to a user;

formulating, by the primary ONU, a secondary ONU downlink bandwidth grant according to the secondary PON user service data and the secondary PON overhead; and sending, by the primary ONU, a secondary PON downlink frame to a secondary ONU according to the secondary ONU downlink bandwidth grant, where the secondary PON downlink frame carries the secondary PON user service data and the secondary PON overhead.

According to another aspect of the embodiments of the present disclosure, an optical network unit includes:

a receiving module, configured to receive a primary PON downlink frame sent by a nested optical line terminal device OLT, where the primary passive optical network PON downlink frame carries a primary ONU uplink bandwidth grant and a secondary ONU uplink bandwidth grant;

a parsing module, configured to parse the primary PON downlink frame to acquire the primary ONU uplink bandwidth grant and the secondary ONU uplink bandwidth grant; and a sending module, configured to send a secondary PON downlink frame to at least one secondary ONU, where the at least one secondary PON downlink frame carries the acquired secondary ONU uplink bandwidth grant.

According to another aspect of the embodiments of the present disclosure, an optical network unit includes:

a receiving module, configured to receive a secondary passive optical network PON downlink frame sent by a primary ONU, where the secondary PON downlink frame carries a secondary ONU uplink bandwidth grant; and a sending module, configured to send a secondary PON uplink frame to the primary ONU according to the received secondary ONU uplink bandwidth grant, where the secondary PON uplink frame carries the received secondary ONU uplink bandwidth grant.

According to another aspect of the embodiments of the present disclosure, an optical line terminal device includes:

a sending module, configured to send a primary passive optical network PON downlink frame to a primary optical network unit ONU, where the primary PON downlink frame carries a primary ONU uplink bandwidth grant and a secondary ONU uplink bandwidth grant;

a receiving module, configured to receive a primary PON uplink frame sent by the primary ONU; and a bandwidth allocating module, configured to: formulate a new secondary ONU uplink bandwidth grant for the secondary ONU according to the primary PON uplink frame; and formulate a new primary ONU uplink bandwidth grant for the primary ONU according to the new secondary ONU uplink bandwidth grant formulated for the secondary ONU.

According to another aspect of the embodiments of the present disclosure, an optical line terminal device includes:

a bandwidth allocating module, configured to formulate a primary ONU downlink bandwidth grant; and a sending module, configured to send a primary passive optical network PON downlink frame to a primary optical network unit ONU according to the primary ONU downlink bandwidth grant, where the primary PON downlink frame carries secondary PON downlink user service data, primary PON overhead, and secondary PON overhead, so that the primary ONU parses the primary PON downlink frame to acquire the secondary PON downlink user service data, the primary PON overhead, and the secondary PON overhead.

According to another aspect of the embodiments of the present disclosure, an optical network unit includes:

a receiving module, configured to receive a primary passive optical network PON downlink frame sent by a nested optical line terminal device OLT, where the primary PON downlink frame carries secondary PON downlink user service data, primary PON overload, and secondary PON overhead;

a parsing module, configured to parse the primary PON downlink frame to acquire the secondary PON downlink user service data, the primary PON overhead, and the secondary PON overhead; and a sending module, configured to send a secondary PON downlink frame to a secondary ONU, where the secondary PON downlink frame carries the secondary PON downlink user service data and the secondary PON overhead.

According to another aspect of the embodiments of the present disclosure, an optical network unit includes:

a receiving module, configured to receive a primary PON downlink frame sent by a nested OLT, and send a secondary PON downlink frame to a secondary ONU, where the primary PON downlink frame carries a primary ONU uplink bandwidth grant and the secondary PON downlink frame carries a secondary ONU uplink bandwidth grant; and a parsing module, configured to parse the primary PON downlink frame to acquire the primary ONU uplink bandwidth grant;

where the receiving module is further configured to receive primary PON uplink user service data;

the receiving module is further configured to receive a secondary PON uplink frame sent by a secondary ONU, where the secondary PON uplink frame carries secondary PON uplink user service data, secondary ONU uplink bandwidth request, and secondary PON overhead; and the parsing module is further configured to: parse the secondary PON uplink frame to acquire the secondary PON uplink user service data, the secondary ONU uplink bandwidth request, and the secondary PON overhead; and formulate a new secondary ONU uplink bandwidth grant for the secondary ONU according to the acquired secondary ONU uplink bandwidth request; and a sending module, configured to send a primary PON uplink frame to the nested OLT, where the primary PON uplink frame carries the primary PON uplink user service data, primary ONU uplink bandwidth request, the secondary PON uplink user service data, and the secondary PON overhead, so that the nested OLT parses the primary PON uplink frame to acquire the primary PON uplink user service data, the primary ONU uplink bandwidth request, the secondary PON uplink user service data, and the secondary PON overhead, thereby formulating a new primary ONU uplink bandwidth grant for the primary ONU.

According to another aspect of the embodiments of the present disclosure, an optical network unit includes:

a receiving module, configured to receive a primary PON downlink frame sent by a nested OLT, where the primary PON downlink frame carries primary PON downlink user service data, secondary PON user service data, primary PON overhead, and secondary PON overhead;

a parsing module, configured to parse the primary PON downlink frame to acquire the primary PON user service data, the secondary PON user service data, the primary PON overhead, and the secondary PON overhead;

a sending module, configured to deliver the primary PON user service data to a user; and a bandwidth allocating module, configured to formulate a secondary ONU downlink bandwidth grant according to the secondary PON user service data and the secondary PON overhead;

where the sending module is further configured to send a secondary PON downlink frame to a secondary ONU according to the secondary ONU downlink bandwidth grant, where the secondary PON downlink frame carries the secondary PON user service data and the secondary PON overhead.

According to the method, device, and nested system for allocating uplink and downlink bandwidth in a nested passive optical network provided in the embodiments of the present disclosure, a nested OLT is mainly responsible for operating, maintaining and managing the entire nested PON system; a primary ONU is mainly responsible for converting frame formats between two stages of PONs, and is also responsible for operating, maintaining and managing a secondary PON; a secondary ONU is responsible for receiving downlink data, and completing uplink transmission according to an uplink grant. The method, device, and nested system for allocating uplink and downlink bandwidth in a nested passive optical network provided in the embodiments of the present disclosure are capable of achieving an optimal overall performance for the two stages of PONs by considering general conditions of the two stages of PONs.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawing from these accompanying drawing without creative efforts.

FIG. 5A and FIG. 5B are a flowchart of a method for allocating uplink bandwidth in a nested passive optical network according to an embodiment of the present disclosure;

FIG. 6 is a flowchart of a method for allocating downlink bandwidth in a nested passive optical network according to an embodiment of the present disclosure;

FIG. 7 is a flowchart of a method for allocating downlink bandwidth in a nested passive optical network according to an embodiment of the present disclosure;

DESCRIPTION OF EMBODIMENTS

To make the objectives, technical solutions, and advantages of the present disclosure more clearly, the following further describes the embodiments of the present disclosure in detail with reference to the accompanying drawings.

The term "standard" in the embodiments of the present disclosure refers to International Telecommunication Union Telecommunication Standardization Sector ITU-T (International Telecommunication Union (ITU) Telecommunication Standardization Sector ITU-T) G984.3 and ITU-T G.987.3.

Figure 1:
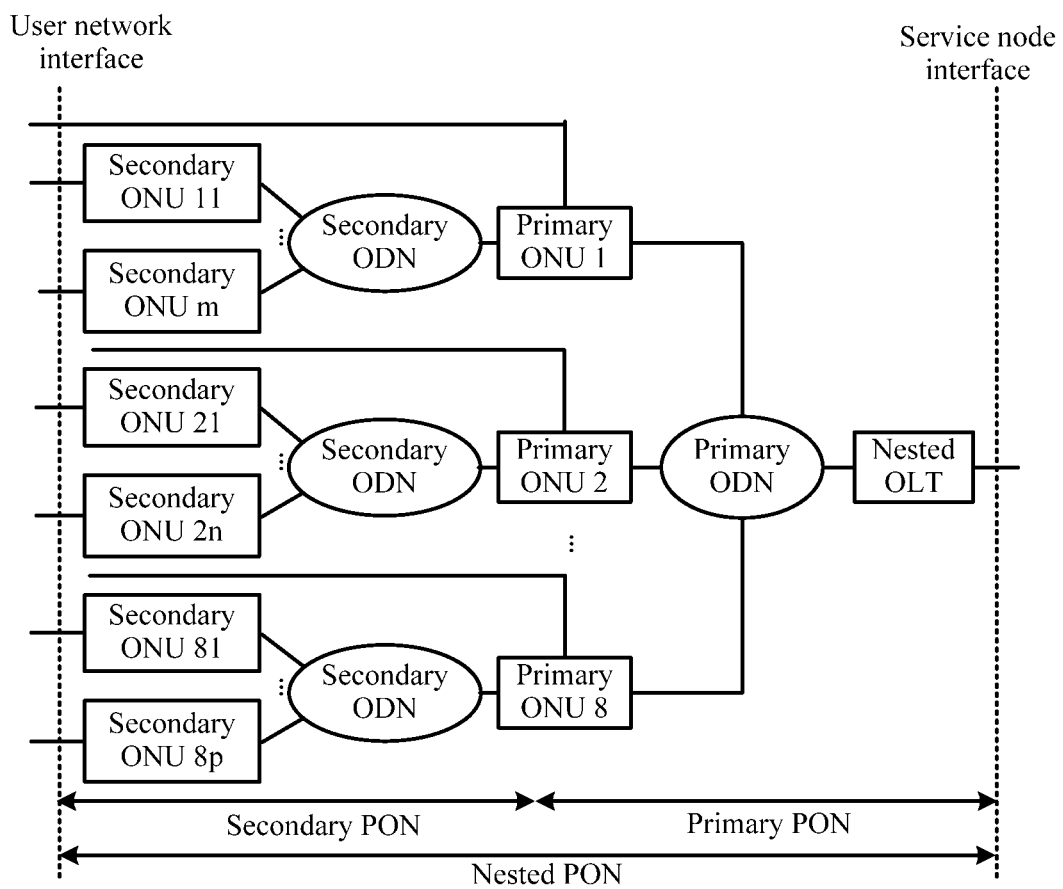
FIG. 1 is a structural diagram of a nested PON network according to an embodiment of the present disclosure.

FIG. 1 is a structural diagram of a nested PON network according to an embodiment of the present disclosure. Referring to FIG. 1, a nested PON is a two-stage PON network, including one or more large-capacity primary PONs and one or more secondary PONs, where each primary PON is connected to one or more secondary PONs. The two-stage PON network includes a nested OLT (Optical Line Terminal, optical line terminal), a primary ODN (Optical Distribution Network, optical distribution network, a primary ONU (Optical Network Unit, optical network unit), a secondary ODN, and a secondary ONU. A user accesses the nested PON network through a primary ONU and a secondary ONU. The user service accessed through the primary ONU is called a primary PON user service, and the user service accessed through the secondary ONU is called a secondary PON user service below. The nested PON is capable of protecting ONU investment in the secondary PON, and the coverage scope of the nested PON is a superposition of the two stages of PONs, thereby increasing the transmission capacity so that it is comparable to the large-capacity primary PON.

It should be noted that dynamic bandwidth allocation is a periodical dynamic process. For ease of description, in this embodiment and the following other embodiments, dynamic bandwidth allocation in a dynamic bandwidth allocation period is taken as an example for description. In addition, in the dynamic bandwidth allocation process, a bandwidth grant and a dynamic request are delivered and reported with a T-CONT as granularity. However, for ease of description, in this embodiment and the following other embodiments, the bandwidth grant and the bandwidth request are called a primary ONU bandwidth grant and a primary ONU bandwidth request, or a secondary ONU bandwidth grant and a secondary ONU bandwidth request.

Figure 2:
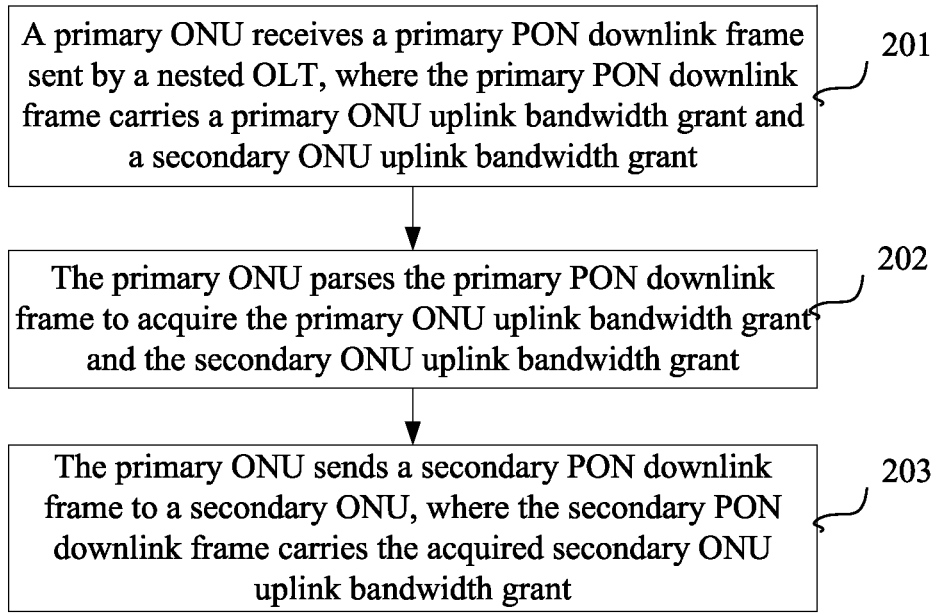
FIG. 2 is a flowchart of a method for allocating uplink bandwidth in a nested passive optical network according to an embodiment of the present disclosure.

FIG. 2 is a flowchart of a method for allocating uplink bandwidth in a nested passive optical network PON according to an embodiment of the present disclosure. This embodiment is based on the network structure illustrated in FIG. 2, and an executor in this embodiment is a primary ONU. Referring to FIG. 2, the method includes:

201. A primary ONU receives a primary PON downlink frame sent by a nested OLT, where the primary PON downlink frame carries a primary ONU uplink bandwidth grant and a secondary ONU uplink bandwidth grant.

202. The primary ONU parses the primary PON downlink frame to acquire the primary ONU uplink bandwidth grant and the secondary ONU uplink bandwidth grant.

203. The primary ONU sends a secondary PON downlink frame to a secondary ONU, where the secondary PON downlink frame carries the acquired secondary ONU uplink bandwidth grant.

In this embodiment, the primary ONU uplink bandwidth and the secondary ONU uplink bandwidth grant are formulated by a nested OLT, and are sent to the primary ONU by the nested OLT using the primary PON downlink frame, and the primary ONU sends the received secondary ONU uplink bandwidth grant to the secondary ONU by using the secondary PON downlink frame. One or more primary ONUs may be deployed, one or more secondary ONUs may be deployed, and each primary ONU is connected to one or more secondary ONUs.

Figure 3:
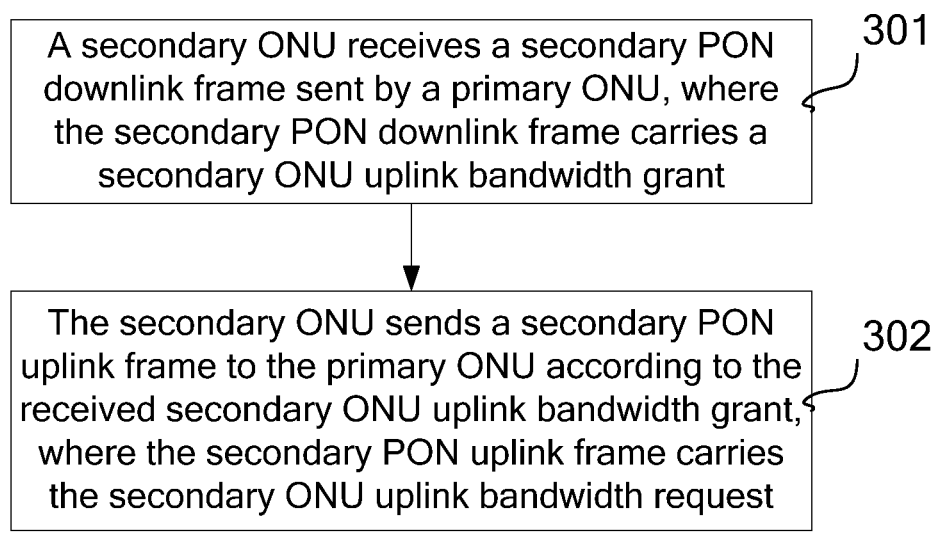
FIG. 3 is a flowchart of a method for allocating uplink bandwidth in a nested passive optical network according to an embodiment of the present disclosure.

FIG. 3 is a flowchart of a method for allocating uplink bandwidth in a nested passive optical network according to an embodiment of the present disclosure. This embodiment is based on the network structure illustrated in FIG. 1, and an executor in this embodiment is a secondary ONU. Referring to FIG. 3, the method includes:

301. A secondary ONU receives a secondary PON downlink frame sent by a primary ONU, where the secondary PON downlink frame carries a secondary ONU uplink bandwidth grant.

302. The secondary ONU sends a secondary PON uplink frame to the primary ONU according to the received secondary ONU uplink bandwidth grant, where the secondary PON uplink frame carries the secondary ONU uplink bandwidth grant.

One or more primary ONUs may be deployed, one or more secondary ONUs may be deployed, and each primary ONU is connected to one or more secondary ONUs.

Figure 4:
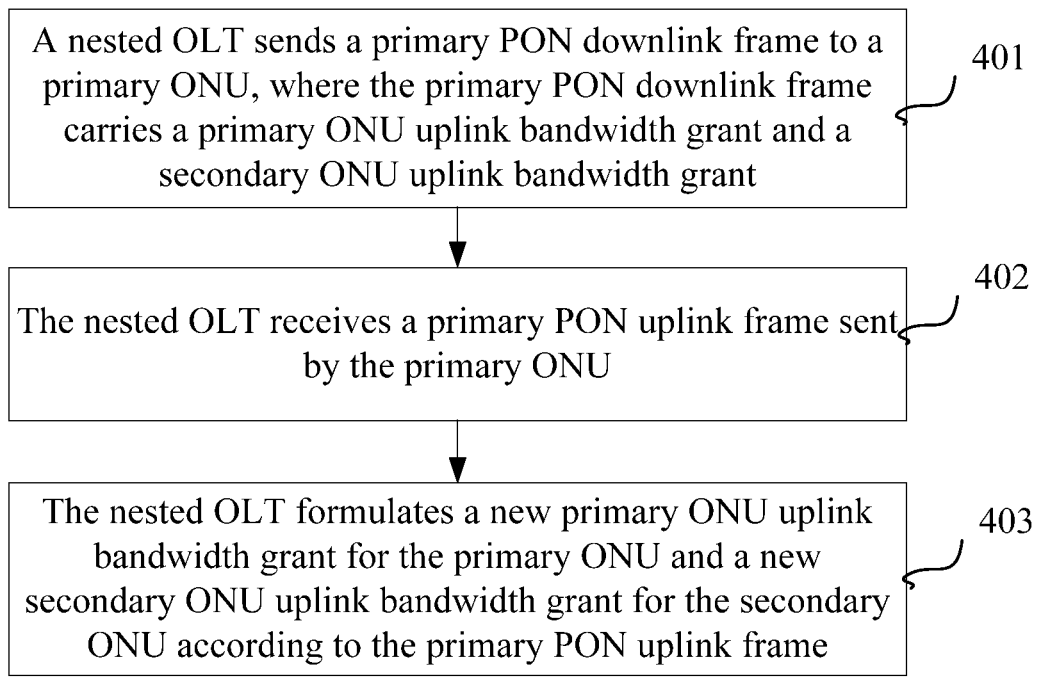
FIG. 4 is a flowchart of a method for allocating uplink bandwidth in a nested passive optical network according to an embodiment of the present disclosure.

FIG. 4 is a flowchart of a method for allocating uplink bandwidth in a nested passive optical network according to an embodiment of the present disclosure. This embodiment is based on the network structure illustrated in FIG. 1, and an executor in this embodiment is a nested OLT. Referring to FIG. 4, the method includes:

401. sending, by a nested OLT a primary PON downlink frame to a primary ONU, where the primary PON downlink frame carries a primary ONU uplink bandwidth grant and a secondary ONU uplink bandwidth grant.

402. receiving a primary PON uplink frame sent by the primary ONU.

403. formulating a new primary ONU uplink bandwidth grant for the primary ONU and a new secondary ONU uplink bandwidth grant for the secondary ONU according to the primary PON uplink frame.

One or more primary ONUs may be deployed, one or more secondary ONUs may be deployed, and each primary ONU is connected to one or more secondary ONUs.

Figure 5A:
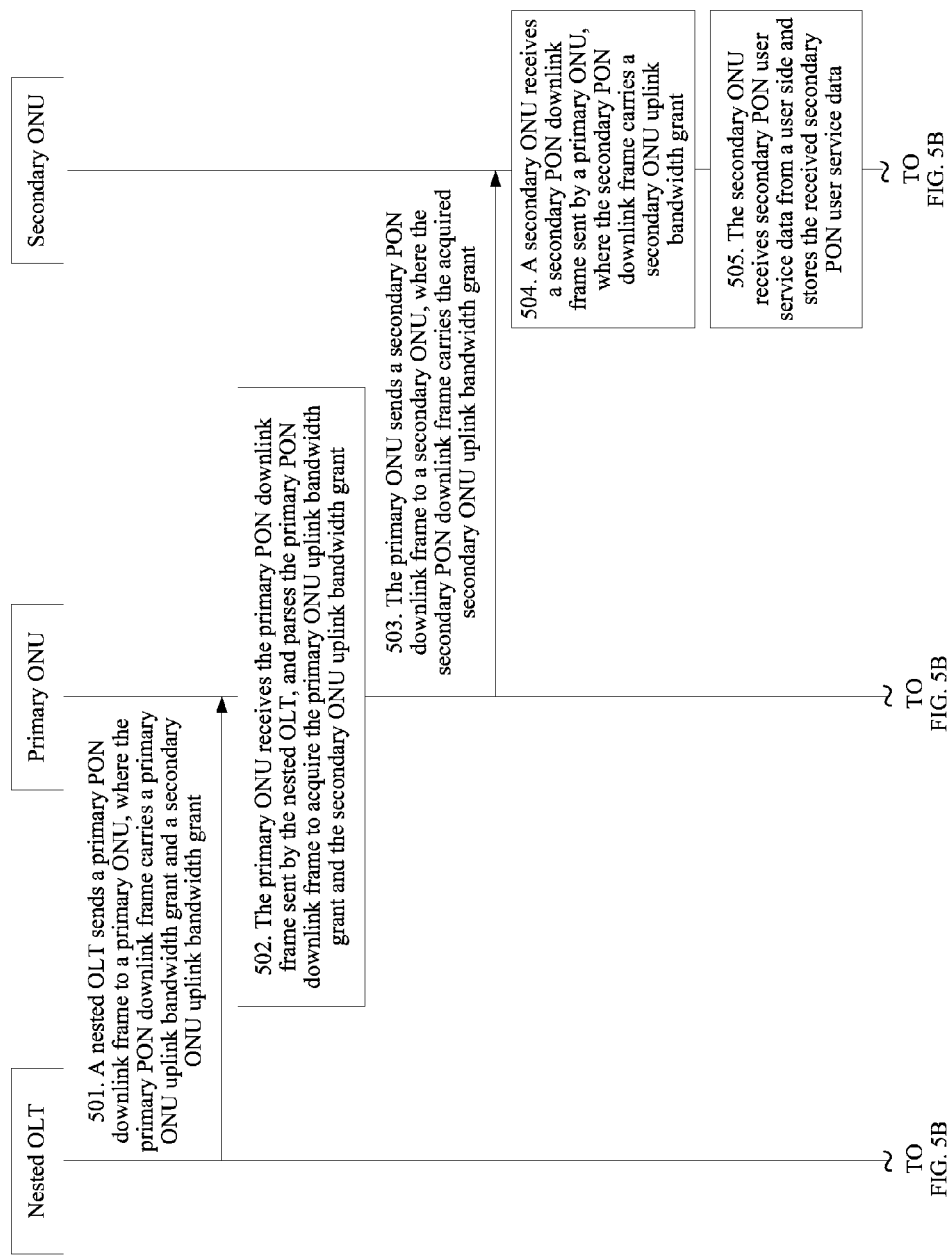

FIG. 5A and FIG. 5B are a flowchart of a method for allocating uplink bandwidth in a nested passive optical network according to an embodiment of the present disclosure. This embodiment is based on the network structure illustrated in FIG. 1, and in the method, interaction subjects are a nested OLT, a primary ONU, and a secondary ONU. Referring to FIG. 5A and FIG. 5B, the method includes:

501. A nested OLT sends a primary PON downlink frame to a primary ONU, where the primary PON downlink frame carries a primary ONU uplink bandwidth grant and a secondary ONU uplink bandwidth grant.

In this embodiment, the nested OLT delivers the primary ONU uplink bandwidth grant and the secondary ONU uplink bandwidth grant by using the primary PON downlink frame. Optionally, the nested OLT uses an overhead field of the primary PON downlink frame to carry the primary ONU uplink bandwidth grant, and uses a payload field of the primary PON downlink frame to carry the secondary ONU uplink bandwidth grant. Optionally, in a GPON and XG-PON (10-Gigabit-capable Passive Optical Network, 10G gigabit-capable passive optical network, x being a natural number), the primary ONU uplink bandwidth grant and the secondary uplink bandwidth grant exist in the form of a bandwidth mapping table, where the bandwidth mapping table in the GPON and XG-PON is used to carry the name of an overhead field of the uplink bandwidth grant. The primary ONU uplink bandwidth grant is in the form of a primary PON bandwidth mapping table, and the secondary ONU uplink bandwidth grant is in the form of a secondary PON bandwidth mapping table. This solves the problem that the primary PON downlink frame has no position to carry the secondary ONU uplink bandwidth grant.

Optionally, the data carried in a payload field in the primary PON downlink frame needs to be encapsulated by using an XGEM (XG-PON Encapsulation Method, XG-PON encapsulation mode). Therefore, 501 may include: encapsulating the secondary ONU uplink bandwidth grant into an XGEM frame, carrying the encapsulated XGEM frame in the payload field in the primary PON downlink frame, carrying the primary ONU uplink bandwidth grant in the overhead field in the primary PON downlink frame, and sending by the nested OLT the primary PON downlink frame carrying both the primary ONU uplink bandwidth grant and the secondary ONU uplink bandwidth grant to the primary ONU. The XGEM frame may be further used to encapsulate other secondary PON overhead, where the secondary PON overhead may include other data that needs to be delivered by the nested OLT to the secondary ONU.

Optionally, the XGEM frame may include an XGEM frame header and an XGEM frame payload field. Optionally, during encapsulation, the payload field in the XGEM frame is used to carry the secondary ONU uplink bandwidth grant, and the least significant two bits in the 16-bit optional function field in the XGEM frame header is used to identify information type of payload field in the XGEM frame. Persons skilled in the art may know that the purpose of the optional function field is not defined in the standards, and is reserved for future possible unknown purposes.

Optionally, if the higher bit in the least significant two bits is 0, it indicates that the current XGEM frame carries primary PON user service data, and the use methods of other fields in the current XGEM frame header are consistent with those in the prior art; if the higher bit in the least significant two bits is 1, it indicates that the current XGEM frame carries secondary ONU uplink bandwidth grant or secondary PON user service data. Then, a specific content carried is determined according to the lower bit in the least significant two bits. If the lower bit in the least significant two bits is 0, it indicates that the current XGEM frame carries secondary PON user service data; if the lower bit in the least significant two bits is 1, it indicates that the current XGEM frame carries secondary ONU uplink bandwidth grant.

Optionally, a 16-bit XGEM port number field and the least significant two bits in the foregoing optional function field in the XGEM frame header together identify the primary ONU and secondary ONU corresponding to the XGEM frame; that is, a 16-bit XGEM port number field and the least significant two bits in the foregoing optional function field in the XGEM frame header together identify which primary ONU will receive the XGEM frame, whether the XGEM frame needs to be sent to the secondary ONU, and which secondary ONU will receive the XGEM frame. Specifically, when the higher bit in the least significant two bits in the optional function field is 0, it indicates that the current XGEM frame carries primary PON user service data, and the XGEM port number is used to identify where the XGEM frame belongs. In addition to a default XGEM port number that is the same as the ONU number, any other XGEM port number owned by the primary ONU needs to be assigned by the OLT. That means, in a scenario where the service data carried in the XGEM frame is no longer delivered to the secondary ONU after being transmitted to the primary ONU, but is sent to a user directly through a user network interface of the primary ONU, a target primary ONU needs to be identified. Therefore, the higher bit in the least significant two bits in the optional function field may be set to 0.

When the higher bit in the least significant two bits in the optional function field is 1 and the lower bit is 0, that the XGEM port number is used to identify where the XGEM frame belongs specifically includes: using the most significant four bits in the XGEM port number to identify different primary ONUs, where, for example, if there are 16 primary ONUs in total, the most significant four bits of the primary ONUs are marked 0000 to 1111; and making the least significant 12 bits in the XGEM port number the same as the GEM port number in the secondary PON user service data carried in the XGEM frame. When the higher bit in the least significant two bits in the optional function field is 1 and the lower bit is 1, the most significant four bits in the XGEM port number are also used to identify different primary ONUs, while the least significant 12 bits in the XGEM port number are set to any fixed value. That is, in a scenario where the service data and overhead carried in the XGEM frame needs to be transmitted to the secondary ONU, a target primary ONU and secondary ONU need to be identified. Therefore, the higher bit in the least significant two bits in the optional function field is 1 and the lower bit is 0, or, the higher bit in the least significant two bits in the optional function field is 1 and the lower bit is 1.

It should be noted that the information type corresponding to a value identified by the least significant two bits may be set according to actual situations. This embodiment only uses the foregoing case as an example for description.

502. The primary ONU receives the primary PON downlink frame sent by the nested OLT, and parses the primary PON downlink frame to acquire the primary ONU uplink bandwidth grant and the secondary ONU uplink bandwidth grant.

Specifically, the primary ONU receives the primary PON downlink frame from the nested OLT. With respect to uplink bandwidth allocation, the primary ONU mainly parses out the primary ONU uplink bandwidth grant and the secondary ONU uplink bandwidth grant from the primary PON downlink frame. Therefore, according to the encapsulation format described in 501, the primary ONU parses out the primary ONU uplink bandwidth grant from an overhead field in the primary PON downlink frame, and parses out the secondary ONU uplink bandwidth grant from an XGEM frame with optional function fields having the two least significant bits of 1 and with the four most significant bits of the XGEM port number being equal to the primary ONU number.

503. The primary ONU sends a secondary PON downlink frame to a secondary ONU, where the secondary PON downlink frame carries the acquired secondary ONU uplink bandwidth grant.

Specifically, the primary ONU uses an overhead field in the secondary PON downlink frame to carry the secondary ONU uplink bandwidth grant acquired by parsing, and sends the secondary PON downlink frame to the secondary ONU.

504. A secondary ONU receives a secondary PON downlink frame sent by a primary ONU, where the secondary PON downlink frame carries a secondary ONU uplink bandwidth grant.

Specifically, the secondary ONU receives the secondary PON downlink frame from the primary ONU, that is, a secondary PON side of the secondary ONU, and acquires the secondary ONU uplink bandwidth grant from the overhead field in the secondary PON downlink frame.

505. The secondary ONU receives secondary PON user service data from a user side and stores the received secondary PON user service data.

Specifically, the secondary ONU receives the secondary PON uplink user service data in the form of, for example, Ethernet frames from a user side. After receiving the secondary PON user service data, the secondary ONU uses caches of different T-CONT types to store the secondary PON user service data. Each T-CONT service descriptor is set according to the service level agreement of the user connected under the secondary ONU.

Optionally, a T-CONT type 1 cache is mainly responsible for carrying services such as traditional voice services, a T-CONT type 2 cache is mainly responsible for carrying services such as network calls and video calls, a T-CONT type 3 cache is used for carrying services such as high-definition and standard-definition television, and video conference, and a T-CONT type 4 cache may be used for carrying services such as webpage browsing, and a T-CONT type 5 may be used for carrying all services. Each type of cache has four major configuration parameters: a fixed bandwidth threshold, a guaranteed bandwidth threshold, a maximum bandwidth threshold, and a descriptor. The T-CONT type 1 and T-CONT type 5 caches both have a fixed bandwidth threshold, and it is recommended that the threshold be set according to a rate of rate-uniform services carried by the caches. The T-CONT type 2, T-CONT type 3, and T-CONT type 5 caches all have an assured bandwidth threshold, and it is recommended that the threshold be set according to an average rate of rate-variable services carried by the caches. The T-CONT type 3, T-CONT type 4, and T-CONT type 5 caches all have a maximum bandwidth threshold, and it is recommended that the threshold be set according to a peak rate of rate-variable services carried by the caches. The T-CONT type 1 and T-CONT type 2 are not involved in allocation of additional bandwidth resources except for fixed bandwidth and assured bandwidth. The T-CONT type 3 employs a non-assured additional bandwidth resource allocation method, the T-CONT type 4 cache employs the best effort mode, and the T-CONT type 5 may employ non-assured and best effort modes.

In addition, if different users need to be distinguished, a plurality of physical queues may be set in the T-CONT, and service data of different users may be stored in different queues.

504 and 505 are not order-sensitive. That is, 504 may be performed first and then 505 is performed; or 505 may be performed first and then 504 is performed; or 504 and 505 are performed simultaneously.

506. The secondary ONU sends a secondary PON uplink frame to the primary ONU according to the received secondary ONU uplink bandwidth grant, where the secondary PON uplink frame carries user service data of the secondary ONU and an uplink bandwidth request of the secondary ONU.

Specifically, the secondary ONU extracts the secondary PON user service data from the cache by using the acquired uplink bandwidth grant, generates overhead for framing, forms the secondary PON uplink frame, and sends the secondary PON uplink frame at a specified time point.

Optionally, the secondary ONU uplink bandwidth grant obtained by the secondary ONU is used to indicate whether the secondary ONU needs to show a real-time change status of uplink service traffic to the nested OLT by reporting an uplink dynamic bandwidth report. If the uplink dynamic bandwidth report needs to be reported, the secondary ONU, according to the standard, needs to read a data volume from an uplink data service buffer, and form an uplink dynamic bandwidth request by coding. In this embodiment, assuming that the uplink bandwidth grant obtained by the secondary ONU indicates that the secondary ONU needs to show a real-time change status of uplink service traffic to the nested OLT by reporting an uplink dynamic bandwidth report, a secondary PON uplink frame sent by the secondary ONU carries the user service data of the secondary ONU and an uplink bandwidth request of the secondary ONU.

507. The primary ONU receives at least one secondary PON uplink frame sent by at least one secondary ONU, where the secondary PON uplink frame carries user service data of the secondary ONU and an uplink bandwidth request of the secondary ONU; and the primary ONU encapsulates the user service data of the at least one ONU and uplink bandwidth request of the at least one ONU into a primary PON uplink frame.

Specifically, in 507, after receiving the secondary PON uplink frame, which is formed by the user service data and uplink bandwidth requests coming from different secondary ONUs, the primary ONU removes the overhead of a protection timeslot, a preamble, a delimiter, a forward error correction code, and a bit interleaved parity field, and encapsulates the whole frame by using an XGEM frame.

Further, different from the XGEM frame encapsulation procedure described in 501, the foregoing secondary PON uplink frame, which still includes secondary ONU uplink bandwidth requests and secondary PON user service data after partial overhead is removed, is put into a payload field of the XGEM frame; and the XGEM port number in the XGEM frame header is used to identify which primary ONU sends the XGEM frame. According to the standard, the uplink XGEM port number ranges from 0 to 65535. The XGEM port number that can be allocated as required ranges from 1023 to 65534, and the uses of other values have been stipulated in the standard. Optionally, in this embodiment, the XGEM port numbers that can be allocated as required are classified as follows: in a value range between 1023 and 65534, fixed port numbers in a number equal to the number of primary ONUs are selected randomly, the port numbers in this equal number are used to identify the XGEM frames where the secondary PON uplink frame is encapsulated, and these port numbers need to correspond to the primary ONUs in a one-to-one manner, so that the nested OLT can identify, according to the port numbers, which primary ONU sends the XGEM frame; in the range between 1023 to 65534, the use methods of other port numbers are consistent with the standard, and when a user connects to the nested PON through a primary ONU, these port numbers are used to encapsulate the primary PON user service data uploaded by the user.

508. The primary ONU sends the primary PON uplink frame to the nested OLT, so that the nested OLT formulates a new ONU uplink bandwidth grant for the primary ONU according to the primary PON uplink frame, and formulates a new secondary ONU uplink bandwidth grant for the at least one secondary ONU.

Optionally, after the XGEM frame encapsulation, the primary ONU extracts the XGEM frame by using a granted bandwidth specified in the primary ONU uplink bandwidth grant, and forms the primary PON uplink frame plus the primary PON uplink frame overhead, and sends the primary PON uplink frame at a specified time point according to the uplink bandwidth grant. It should be noted that, in this embodiment, the primary ONU uplink bandwidth grant will not require the primary ONU to report the bandwidth request; the nested OLT may predict, by using a preset policy, an uplink bandwidth demand of the primary ONU according to the acquired bandwidth request of the secondary ONU, and formulate a new primary ONU uplink bandwidth grant for the primary ONU according to the predicted uplink bandwidth demand of the primary ONU.

509. The nested OLT parses the primary PON uplink frame to acquire the secondary PON user service data and the secondary ONU uplink bandwidth request, and sends the secondary PON user service data to an upper-layer network.

Specifically, the nested OLT receives from the primary PON side thereof the primary PON uplink frames from different primary ONUs; differentiates, according to the port number of the XGEM frames, the ONUs where various XGEM frames are from; and distinguishes the secondary ONU uplink dynamic bandwidth requests and secondary PON user service data uploaded by different secondary ONUs from overhead fields of the XGEM frames.

Optionally, the nested OLT sends the received user service data to an upper-layer network, decodes the secondary ONU uplink dynamic bandwidth report, stores the secondary ONU uplink bandwidth request to formulate a new primary ONU uplink bandwidth grant for the primary ONU and a new secondary ONU uplink bandwidth grant for the secondary ONU.

510. The nested OLT formulates a new secondary ONU uplink bandwidth grant for the secondary ONU according to the primary PON uplink frame.

Specifically, the nested OLT formulates a new secondary ONU uplink bandwidth grant for the secondary ONU according to primary PON and secondary PON available bandwidth resources, such preconfiguration information as user service level agreement, and the secondary ONU uplink bandwidth request. The primary PON and secondary PON available bandwidth resources refer to bandwidth, in the primary PON and secondary PON, capable of carrying such user service data as XGEM and GEM frames or Ethernet frames. Overhead of the physical layer and transport convergence layer, and allocated bandwidth resources need to be taken away from the uplink line bandwidth. The preconfiguration information refers to information capable of reflecting quality of service requirements of the cache, including a T-CONT type, a fixed bandwidth threshold, an assured bandwidth threshold, a maximum bandwidth threshold, and a descriptor. The secondary ONU uplink bandwidth request refers to real-time occupancy of secondary ONU local data caches, which is reflected by the secondary ONU using an uplink dynamic bandwidth report to the nested OLT.

Optionally, the nested OLT employs the dynamic bandwidth allocation algorithm according to the foregoing information to formulate a new secondary ONU uplink bandwidth grant for the secondary ONU according to allocation sequences and allocation principles specified in the standards for different types of caches. During formulation of the new secondary ONU uplink bandwidth grant, in addition to ensuring that the total granted bandwidth acquired by the secondary ONUs in one secondary PON do not exceed the total available bandwidth of the secondary PON, it is also necessary to ensure that the total granted bandwidth acquired by all secondary ONUs in all secondary PONs do not exceed the total available bandwidth of the primary PON.

Optionally, the employed dynamic bandwidth allocation algorithm essentially refers to timely, fairly and effectively adjusting, according to real-time changes of the uplink service traffic, the uplink bandwidth allocated to the ONU. The employed dynamic bandwidth allocation algorithm differentiated ensures quality of service requirements of different services, ensures fairness of different ONUs or users, and ensures full utilization of the bandwidth resources. Bandwidth allocation for caches of different T-CONT types should observe a sequence of allocating fixed bandwidth for T-CONT type 1 and 5 caches firstly, allocating assured bandwidth for T-CONT types 2, 3, and 5 caches secondly, allocating non-assured additional bandwidth for T-CONT types 3 and 5 caches thirdly, and allocating best effort additional bandwidth for T-CONT types 4 and 5 caches lastly. In this way, on-demand bandwidth allocation is achieved by means of assured bandwidth to ensure effective utilization of the bandwidth resources, and further cache weight-based bandwidth allocation is achieved by means of additional bandwidth allocation to ensure fair utilization of the bandwidth resources. In addition, services of different service features are stored in different types of caches so that differentiated quality of service assurance is provided for the services.

Specifically, the nested OLT employs the dynamic bandwidth algorithm to formulate uplink bandwidth grants for the primary ONU and the secondary ONU. Here formulating an uplink bandwidth grant for the secondary ONU is used as an example for description. The dynamic bandwidth allocation algorithm may be employed. The nested OLT firstly allocates fixed bandwidth for type 1 and type 5 caches of each of the primary ONUs. Regardless of whether the cache receives a bandwidth request within the period, the cache is allocated with bandwidth equal to the fixed bandwidth threshold.

Then, assured bandwidth is allocated to types 2, 3, and 5 caches. The cache bandwidth request is compared with the assured bandwidth threshold in terms of bandwidth value, and bandwidth equal to the smaller bandwidth is allocated or additionally allocated to the cache, that is, on-demand bandwidth allocation. However, the maximum value should not exceed the assured bandwidth threshold. Bandwidth is additionally allocated to the type 5 cache. That is, the bandwidth that has been allocated to the type 5 cache during fixed bandwidth allocation is added with the bandwidth that is allocated to the type 5 cache during assured bandwidth allocation.

Subsequently, non-assured additional bandwidth except the fixed bandwidth and assured bandwidth is allocated to type 3 and 5 caches. When the available bandwidth is smaller than a preset fixed value, it is determined that the available bandwidth is used up, and the bandwidth allocation ends. When there is still available bandwidth, the sum of the fixed bandwidth threshold and the assured bandwidth threshold is used as a weight, the available bandwidth is additionally allocated to the cache according to the proportion of the weight. To fully utilize the bandwidth, another method may be selected to additionally allocate the bandwidth that is acquired according to the weight, and the smaller one of the bandwidth request of the cache and the maximum bandwidth threshold of the cache.

Finally, best effort additional bandwidth is allocated to type 4 and 5 caches. When the available bandwidth is smaller than a preset fixed value, it is determined that the available bandwidth is used up, and the bandwidth allocation ends. When there is still available bandwidth, using the difference between the maximum bandwidth threshold of the cache, and the sum of the fixed bandwidth threshold and the assured bandwidth threshold as a weight, the available bandwidth is additionally allocated to the cache according to the proportion of the weight.

Another method of partially introducing on-demand allocation may be selected to additionally allocate the bandwidth that is acquired according to the weight, and the smaller one of the bandwidth request of the cache and the maximum bandwidth threshold of the cache.

It should be noted that after bandwidth is allocated or additionally allocated to the cache, the bandwidth request of the cache and the secondary PON available bandwidth need to be timely updated.

The foregoing description of the dynamic bandwidth allocation algorithm is only application to the scenario where the nested OLT formulates a new primary ONU uplink bandwidth grant for the primary ONU.

511. The nested OLT formulates a new primary ONU uplink bandwidth grant for the primary ONU according to the formulated new secondary ONU uplink bandwidth grant.

Specifically, in this embodiment, the user service data is all accessed into the nested PON by using the secondary ONU; therefore, the uplink bandwidth request of the primary ONU fully depends on the uplink data volume sent by the secondary ONU of the primary ONU. The nested OLT may determine the uplink bandwidth demand of the primary ONU according to the uplink bandwidth grant of the secondary ONU.

In this embodiment, the primary ONU does not report the primary ONU uplink bandwidth request. The nested OLT converts the formulated new secondary ONU uplink bandwidth grant into the primary ONU uplink bandwidth request, and formulates a new ONU bandwidth grant according to such indirectly acquired bandwidth request.

Optionally, the nested OLT calculates the secondary PON service data and overhead received by the primary ONU by using the uplink bandwidth grants of all secondary ONUs in one primary ONU, and further calculates the uplink bandwidth demand of the primary ONU. The nested OLT formulates a new primary ONU uplink bandwidth grant for the primary ONU according to the calculated uplink bandwidth request.

Optionally, the uplink bandwidth of the primary ONU may be made equal to the uplink bandwidth request, so that the primary ONU sends all uplink data received from a primary PON uplink frame to the nested OLT.

510 and 511 are not order-sensitive. That is, 510 may be performed first and then 511 is performed; or 511 may be performed first and then 510 is performed; or 510 and 511 are performed simultaneously.

In this embodiment, one or more primary ONUs may be deployed, one or more secondary ONUs may be deployed, and each primary ONU is connected to one or more secondary ONUs.

According to the method provided in the present disclosure, the nested OLT periodically formulates a new primary ONU uplink bandwidth grant for the primary ONU and a new secondary ONU uplink bandwidth grant for the secondary ONU according to real-time changes of uplink service traffic, service level agreement signed with a user, and current available bandwidth in the system. The primary ONU maps a secondary PON uplink frame to a primary PON uplink frame. The secondary ONU receives service data from a user side, and periodically reports, according to the real-time changes of the uplink traffic, a bandwidth request to each T-CONT where user service data having similar quality of service requirements is stored. In addition, according to the present disclosure, secondary PON data is encapsulated into a primary PON, including encapsulating secondary PON overhead and secondary PON user service data by using an overhead field in the primary PON uplink frame, and identifying, by using an identifier field, the type of the data encapsulated in a payload field. This solves issues of transferring such overhead data as the bandwidth request and the bandwidth grant in the nested two-stage PON network, and of converting frame formats between two stages of PONs. In addition, according to the present disclosure, a dynamic bandwidth report capable of reflecting real-time changes of the uplink traffic is reported periodically, and the nested OLT periodically formulates a bandwidth grant according to the received real-time changes of the uplink service traffic, preconfiguration information of the user service level agreement, and remaining available bandwidth in the system. This ensures that the system is capable of dynamically allocating bandwidth according to actual traffic changes, and ensures effective and full utilization of the bandwidth.

FIG. 6 is a flowchart of a method for allocating downlink bandwidth in a nested passive optical network according to an embodiment of the present disclosure. This embodiment is based on the network structure illustrated in FIG. 1, and an executor in this embodiment is a nested OLT. Referring to FIG. 6, the method includes:

601. A nested OLT formulates a primary ONU downlink bandwidth grant, sends a primary PON downlink frame to a primary ONU according to the primary ONU downlink bandwidth grant, where the primary PON downlink frame carries secondary PON downlink user service data, primary PON overhead, and secondary PON overhead, so that the primary ONU parses the primary PON downlink frame to acquire the secondary PON downlink user service data, the primary PON overhead, and the secondary PON overhead.

In this embodiment, one or more primary ONUs may be deployed, one or more secondary ONUs may be deployed, and each primary ONU is connected to one or more secondary ONUs.

FIG. 7 is a flowchart of a method for allocating downlink bandwidth in a nested passive optical network according to an embodiment of the present disclosure. This embodiment is based on the network structure illustrated in FIG. 1, and an executor in this embodiment is a primary ONU. Referring to FIG. 7, the method includes:

701. A primary ONU receives a primary PON downlink frame sent by a nested OLT, where the primary PON downlink frame carries secondary PON downlink user service data, primary PON overload, and secondary PON overhead.

702. The primary ONU parses the primary PON downlink frame to acquire the secondary PON downlink user service data, the primary PON overhead, and the secondary PON overhead.

703. The primary ONU sends a secondary PON downlink frame to a secondary ONU, where the secondary PON downlink frame carries the secondary PON downlink user service data and the secondary PON overhead.

In this embodiment, one or more primary ONUs may be deployed, one or more secondary ONUs may be deployed, and each primary ONU is connected to one or more secondary ONUs.

Figure 8:
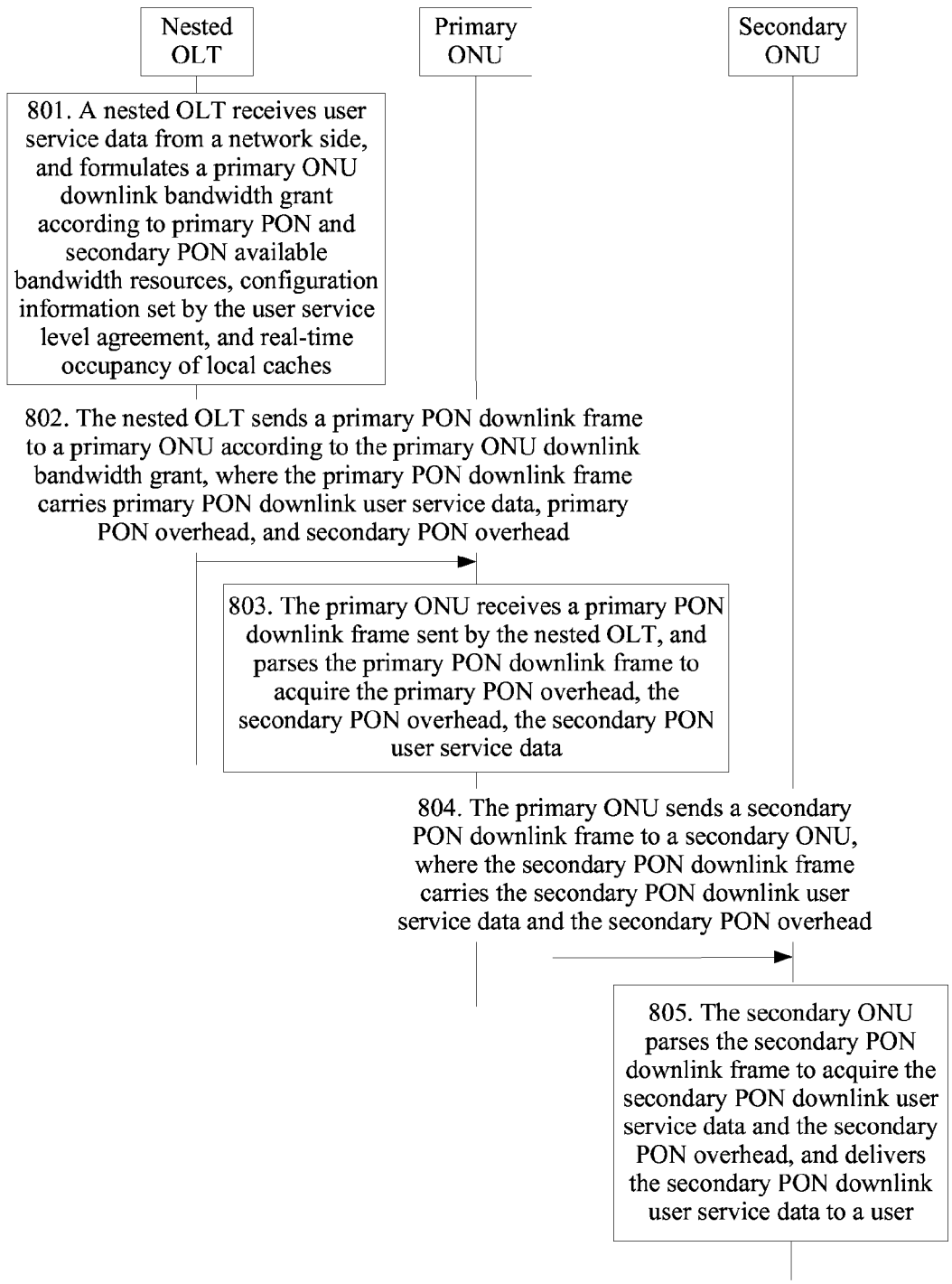
FIG. 8 is a flowchart of a method for allocating downlink bandwidth in a nested passive optical network according to an embodiment of the present disclosure.

FIG. 8 is a flowchart of a method for allocating downlink bandwidth in a nested passive optical network according to an embodiment of the present disclosure. This embodiment is based on the network structure illustrated in FIG. 1, and in the method, interaction subjects are a nested OLT, a primary ONU, and a secondary ONU. Referring to FIG. 8, the method includes:

801. A nested OLT receives user service data from a network side, and formulates a primary ONU downlink bandwidth grant according to primary PON and secondary PON available bandwidth resources, preconfiguration information set by the user service level agreement, and real-time occupancy of local caches.

Optionally, the nested OLT receives downlink user service data in the form of, for example, Ethernet frames from the network side. After receiving the downlink user service data, the nested OLT uses caches of different T-CONT types to store the downlink user service data.

It should be noted that the nested OLT, during bandwidth granting, needs to ensure that the total granted bandwidth to all primary ONUs do not exceed the total available bandwidth of the primary ONU, and the downlink data to be sent to one primary ONU does not exceed the total available bandwidth of a single secondary PON.

802. The nested OLT sends a primary PON downlink frame to a primary ONU according to the primary ONU downlink bandwidth grant, where the primary PON downlink frame carries primary PON downlink user service data, primary PON overhead, and secondary PON overhead.

Optionally, the nested OLT extracts, according to the formulated primary ONU bandwidth grant, the secondary PON user service data to be delivered from the local cache, and generates secondary PON overhead to be delivered to the primary ONU to generate the secondary PON downlink frame. Then, the nested OLT encapsulates the user service data and the secondary PON overhead into an XGEM frame, and forms the primary PON downlink frame.

Optionally, the secondary PON user service data and the secondary PON overhead are encapsulated into an XGEM frame by using the method described in 501. For the secondary PON user service data, mapping a service data packet such as an Ethernet frame into the XGEM frame according to standards is only setting the most significant four bits of the XGEM port number in the XGEM frame header to the target primary ONU number, the least significant 12 bits to the GEM port number of the service data packet, and the least significant two bits of the optional function field to 10 in binary. For the secondary PON overhead, an overhead that belongs to a secondary PON downlink frame is mapped into an XGEM frame, the most significant four bits of the XGEM port number in the XGEM frame header is set to a target primary ONU number, and the least significant two bits of the optional function field is set to 11 in binary.

The primary PON overhead mainly includes a physical synchronization sequence, a superframe count structure, a PON identifier, a forward error correction code, a bandwidth mapping table, a downlink physical layer operation maintenance management overhead, and the like. The bandwidth mapping table is used to inform the primary ONU of the primary ONU uplink bandwidth grant defined by the OLT for the primary ONU. The secondary PON overhead is generated at the nested OLT, and is sent to the primary ONU through a payload field of the primary PON downlink frame in a form of an XGEM frame. By using the overhead, the primary ONU generates partial overhead in the secondary PON downlink frame. The secondary PON overhead includes an identifier field (Ident field), a downlink physical layer operation maintenance management overhead, a 2-byte bandwidth mapping table length field, and a bandwidth mapping table. The identifier field, downlink physical layer operation maintenance and management overhead, and bandwidth mapping table are directly used as a part of the secondary PON downlink frame, and the 2-byte bandwidth mapping table length field is used to restore all 8-byte downlink payload length fields in the secondary PON downlink frame. The most significant 12 bits of the 2-byte bandwidth mapping table length field are the same as the bandwidth mapping table length field stipulated in the standard, and the least significant four bits are cyclic redundancy code check bits of the most significant 12 bits.

803. The primary ONU receives a primary PON downlink frame sent by the nested OLT, and parses the primary PON downlink frame to acquire the primary PON overhead, the secondary PON overhead, the secondary PON user service data.

Specifically, the primary ONU receives the primary ONU from the nested OLT, and parses out such primary PON overhead as the primary ONU uplink bandwidth grant, and the XGEM frame. Then, according to the XGEM frame encapsulation method described in 802, the secondary PON user service data and the secondary PON overhead are parsed out from the XGEM frame.

804. The primary ONU sends a secondary PON downlink frame to a secondary ONU, where the secondary PON downlink frame carries the secondary PON downlink user service data and the secondary PON overhead.

Specifically, the primary ONU encapsulates the secondary PON user service data into a GEM frame, where a GEM port number carried in the header field of the GEM frame is the 12 least significant bits of the XGEM port number carried in the header field of the XGEM frame. All GPON transport convergence layer overhead needed for recovering and generated the secondary PON downlink frame by using the parsed secondary PON overhead, and then the secondary PON downlink frame is generated and delivered. That is, the nested OLT has designed a secondary PON downlink frame to be delivered by the primary ONU during formation of the primary PON downlink frame.

All overhead needed for generating the secondary PON downlink frame includes a physical synchronization field, an identifier field, a downlink physical layer operation maintenance and management overhead, a bit interleaved parity code field, a downlink payload length field, and a bandwidth mapping table. The physical synchronization field and the bit interleaved parity check code field are calculated and generated by the primary ONU; the 12 most significant bits of the downlink payload length field use the 12 most significant bits of a bandwidth mapping table length field in the received secondary PON overhead, with the remaining bits padded as required in the standards; and the other overhead directly uses the received secondary PON overhead.

805. The secondary ONU parses the secondary PON downlink frame to acquire the secondary PON downlink user service data and the secondary PON overhead, and delivers the secondary PON downlink user service data to a user.

The embodiment illustrated in FIG. 8 may be implemented based on the embodiment illustrated in FIG. 5A and FIG. 5B, or may be implemented independently.

In this embodiment, one or more primary ONUs may be deployed, one or more secondary ONUs may be deployed, and each primary ONU is connected to one or more secondary ONUs.

According to the method provided in the present disclosure, the nested OLT periodically formulates a downlink bandwidth grant according to real-time changes of downlink service traffic, service level agreement signed with a user, and current available bandwidth in the system. The primary ONU forms the secondary downlink frame by using the received primary PON downlink frame. In addition, according to the present disclosure, secondary PON data is encapsulated into a primary PON, including encapsulating secondary PON overhead and secondary PON user service data by using overhead fields in the primary PON uplink and downlink frames, and identifying, by using an identifier field, the type of the data encapsulated in a payload field. This solves issues of transferring such overhead data as the bandwidth request and the bandwidth grant in the nested two-stage PON network, and of converting frame formats between two stages of PONs. In addition, according to the present disclosure, a dynamic bandwidth report capable of reflecting real-time changes of the uplink traffic is reported periodically, and the nested OLT periodically formulates a bandwidth grant according to the received or locally cached real-time changes of the uplink service traffic, preconfiguration information of the user service level agreement, and remaining available bandwidth in the system. This ensures that the system is capable of dynamically allocating bandwidth according to actual traffic changes, and ensures effective and full utilization of the bandwidth.

Figure 9:
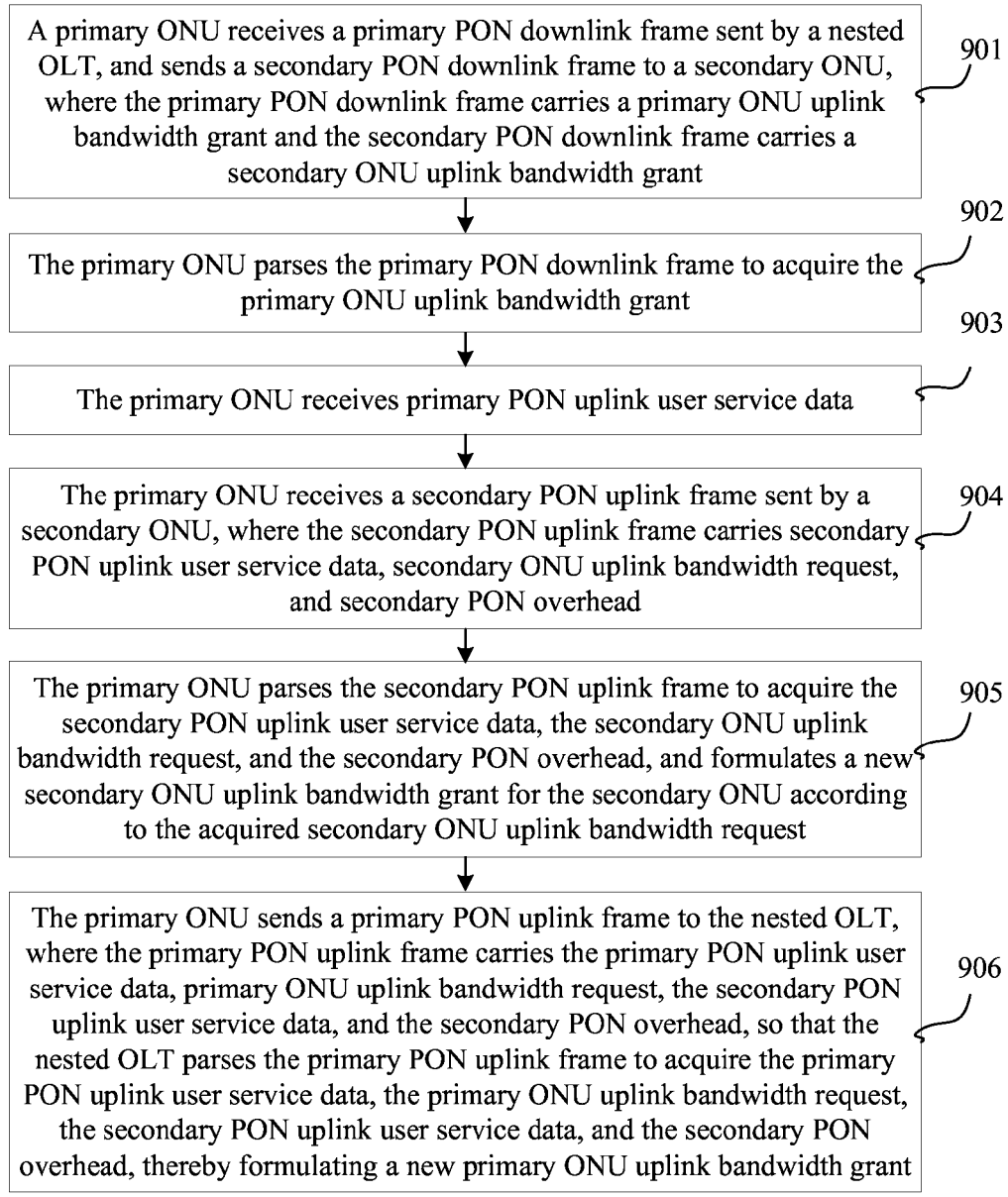
FIG. 9 is a flowchart of a method for allocating uplink bandwidth in a nested passive optical network according to an embodiment of the present disclosure.

FIG. 9 is a flowchart of a method for allocating uplink bandwidth in a nested passive optical network according to an embodiment of the present disclosure. This embodiment is based on the network structure illustrated in FIG. 1, and an executor in this embodiment is a primary ONU. Referring to FIG. 9, the method includes:

901. A primary ONU receives a primary PON downlink frame sent by a nested OLT, and sends a secondary PON downlink frame to a secondary ONU, where the primary PON downlink frame carries a primary ONU uplink bandwidth grant and the secondary PON downlink frame carries a secondary ONU uplink bandwidth grant.

902. The primary ONU parses the primary PON downlink frame to acquire the primary ONU uplink bandwidth grant.

903. The primary ONU receives primary PON uplink user service data.

904. The primary ONU receives a secondary PON uplink frame sent by a secondary ONU, where the secondary PON uplink frame carries secondary PON uplink user service data, secondary ONU uplink bandwidth request, and secondary PON overhead.

903 and 904 are not order-sensitive. That is, 903 may be performed first and then 904 is performed; or 904 may be performed first and then 903 is performed; or 903 and 904 are performed simultaneously.

905. The primary ONU parses the secondary PON uplink frame to acquire the secondary PON uplink user service data, the secondary ONU uplink bandwidth request, and the secondary PON overhead, and formulates a new secondary ONU uplink bandwidth grant for the secondary ONU according to the acquired secondary ONU uplink bandwidth request.

906. The primary ONU sends a primary PON uplink frame to the nested OLT, where the primary PON uplink frame carries the primary PON uplink user service data, primary ONU uplink bandwidth request, the secondary PON uplink user service data, and the secondary PON overhead, so that the nested OLT parses the primary PON uplink frame to acquire the primary PON uplink user service data, the primary ONU uplink bandwidth request, the secondary PON uplink user service data, and the secondary PON overhead, thereby formulating by the nested OLT a new primary ONU uplink bandwidth grant for the primary ONU.

In this embodiment, one or more primary ONUs may be deployed, one or more secondary ONUs may be deployed, and each primary ONU is connected to one or more secondary ONUs.

Figure 10:
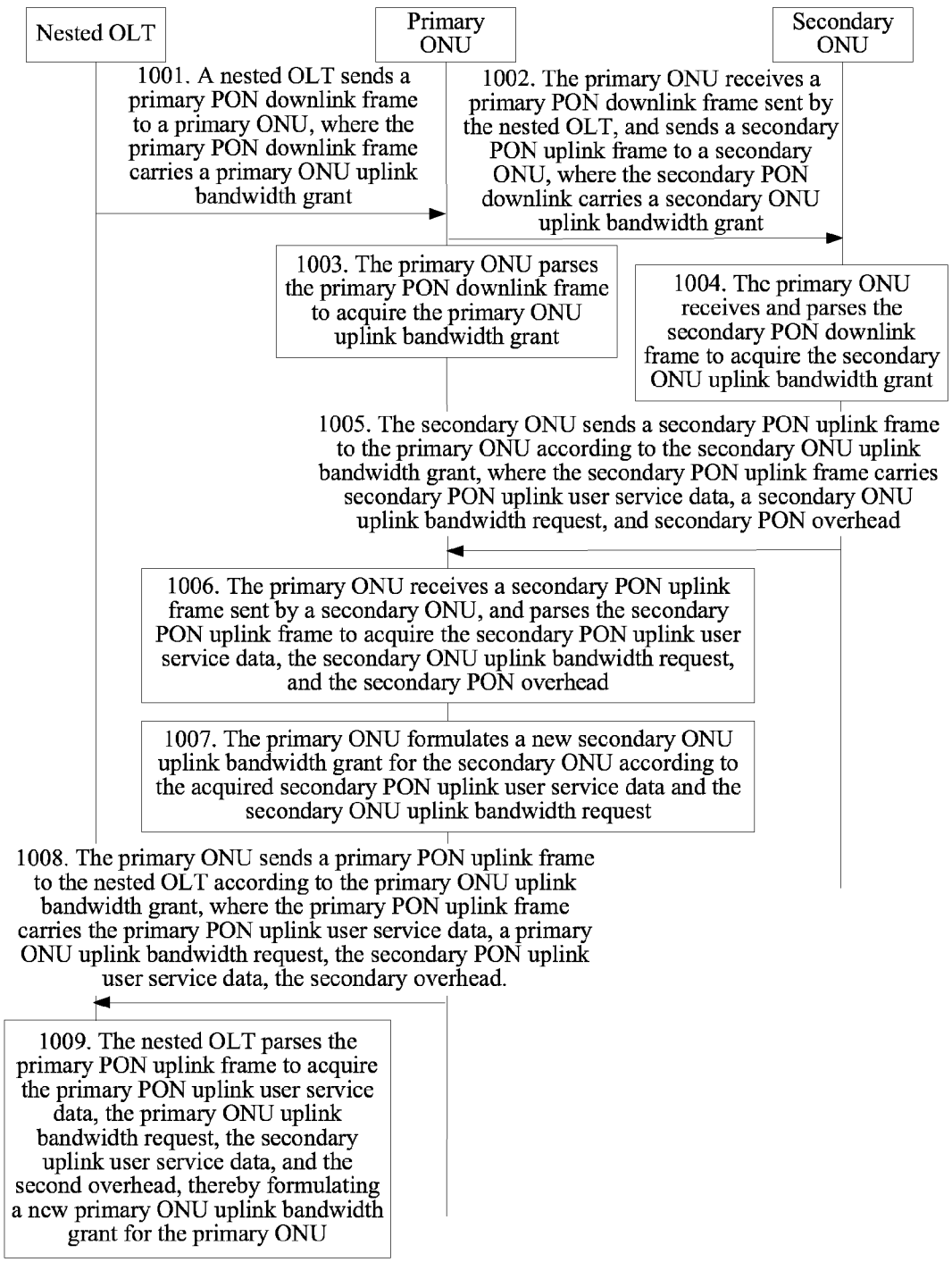
FIG. 10 is a flowchart of a method for allocating uplink bandwidth in a nested passive optical network according to an embodiment of the present disclosure.

FIG. 10 is a flowchart of a method for allocating uplink bandwidth in a nested passive optical network according to an embodiment of the present disclosure. This embodiment is based on the network structure illustrated in FIG. 1, and in the method, interaction subjects are a nested OLT, a primary ONU, and a secondary ONU. Referring to FIG. 10, the method includes:

1001. A nested OLT sends a primary PON downlink frame to a primary ONU, where the primary PON downlink frame carries a primary ONU uplink bandwidth grant.

Specifically, as specified in standards, in the present disclosure, an overhead field in the primary PON downlink frame carries the primary ONU uplink bandwidth grant.

1002. The primary ONU receives a primary PON downlink frame sent by the nested OLT, and sends a secondary PON uplink frame to a secondary ONU, where the secondary PON downlink frame carries a secondary ONU uplink bandwidth grant.

Specifically, as specified in standards, in the present disclosure, an overhead field in the secondary PON downlink frame carries the secondary ONU uplink bandwidth grant.

1003. The primary ONU parses the primary PON downlink frame to acquire the primary ONU uplink bandwidth grant.

Specifically, after receiving the primary PON downlink frame from the nested OLT, the primary ONU extracts the primary ONU uplink bandwidth grant from the overhead field in the primary PON downlink frame.

1004. The primary ONU receives and parses the secondary PON downlink frame to acquire the secondary ONU uplink bandwidth grant.

After receiving the secondary PON downlink frame from the primary ONU, the secondary ONU acquires the secondary ONU uplink bandwidth grant by parsing from the overhead field in the secondary PON downlink frame.

Specifically, the primary ONU and the secondary ONU receive the uplink user service data in the form of, for example, Ethernet frames, from a user side. After receiving the secondary PON user service data, the primary ONU and the secondary ONU use caches of different T-CONT types to store the uplink user service data.

1005. The secondary ONU sends a secondary PON uplink frame to the primary ONU according to the secondary ONU uplink bandwidth grant, where the secondary PON uplink frame carries secondary PON uplink user service data, a secondary ONU uplink bandwidth request, and secondary PON overhead.

1005 is similar to 506, which is therefore not described herein any further.

1006. The primary ONU receives a secondary PON uplink frame sent by a secondary ONU, and parses the secondary PON uplink frame to acquire the secondary PON uplink user service data, the secondary ONU uplink bandwidth request, and the secondary PON overhead.

As specified in the standards, the secondary PON overhead refers to a prefix character, a delimiter, and other secondary PON overhead such as secondary PON uplink physical layer operation maintenance and management overhead, in addition to the secondary ONU uplink bandwidth request. For centralized management on the nested PON by the nested OLT, the primary PON may need to forward secondary PON PLOAMu (Physical Layer OAM Operations, Administrations and Maintenance upstream, physical layer OAM operations, administrations and maintenance upstream) to the nested OLT. The secondary PON PLOAMu is a 13-byte overhead packet having a fixed format, and is generally used to activate an ONU, establish a management channel, encrypt configuration, and serve as important management and alarm commands. Optionally, the primary ONU may store the secondary PON PLOAMu and the secondary user service data to the same cache.

1007. The primary ONU formulates a new secondary ONU uplink bandwidth grant for the secondary ONU according to the acquired secondary PON uplink user service data and the secondary ONU uplink bandwidth request.

Specifically, after acquiring the secondary PON user service data, the primary ONU uses an independent T-CONT type 5 cache to store the data. In addition, a service descriptor is configured for the cache to ensure that the secondary PON user service data occupying the secondary PON bandwidth resource and reaching the primary ONU enjoys a higher priority over the primary PON user service that is directly received by the primary ONU from the user side. In this way, the characteristic that the nested PON has two stages of PON networks is considered, and the QoS is ensured in consideration of the two stages of PONs. This ensures effective utilization of the nested PON bandwidth resource and improves overall performance of the nested PON.

After acquiring the secondary ONU uplink bandwidth request, the primary ONU processes the secondary ONU uplink bandwidth request, and formulates a new secondary ONU uplink bandwidth grant according to secondary PON available bandwidth resources, preconfiguration information set by the user service level agreement, and real-time state of secondary ONU uplink service traffic.

Optionally, in the embodiment of the present disclosure, the primary ONU uses the T-CON type 5 cache to store the secondary PON user service and the secondary PON PLOAMu, and configures the cache in to the following manners:

The fixed bandwidth threshold is equal to the sum of the fixed bandwidth of ONU T-CONT type 1 and 5 caches of all secondary ONUs connected to the primary ONU.

The assured bandwidth threshold is equal to the sum of the assured bandwidth of T-CONT types 2 and 5 caches of all secondary ONUs connected to the primary ONU and the maximum bandwidth of the T-CONT type 3 cache.

The maximum threshold is equal to the sum of the maximum bandwidth of caches of all secondary ONUs connected to the primary ONU.

Except the fixed bandwidth and the assured bandwidth, an additional bandwidth may also be employed, which uses the non-assured bandwidth allocation method.

The assured bandwidth needs to be set to be larger than the sum of assured bandwidth of T-CONT types 2, 3 and 5 caches of all secondary ONU connected to the primary ONU, and smaller than the maximum bandwidth. On the prerequisite that this condition is met, the assured bandwidth may be set using other method, not limited to the foregoing method for setting the assured bandwidth.

The T-CONT type 5 data cache of the uplink secondary PON may be set to a plurality of queues, respectively for storing service data with different priorities and overhead data, so that differentiated QoS is provided for the queues with different priorities on the primary ONU. For example, when the primary ONU receives an uplink bandwidth grant for the cache, data is preferentially scheduled from a queue with a high priority.

1008. The primary ONU sends a primary PON uplink frame to the nested OLT according to the primary ONU uplink bandwidth grant, where the primary PON uplink frame carries the primary PON uplink user service data, a primary ONU uplink bandwidth request, the secondary PON uplink user service data, the secondary overhead.

Specifically, the primary ONU, based on a manner specified in the standards, extracts data from the cache by using the uplink bandwidth grant, generate overhead needed for framing, forms the primary PON uplink frame, and sends the primary PON uplink frame at a specified time point.

Optionally, the primary ONU uplink bandwidth grant will inform the primary ONU as whether to report real-time changes of the primary ONU uplink service traffic to the nested OLT by sending an uplink dynamic bandwidth report. If the uplink dynamic bandwidth report needs to be sent, the primary ONU needs to read data volume from the cache as the standards specified, and forms the uplink dynamic bandwidth report by coding, and reflects the primary ONU uplink bandwidth request. The primary ONU uplink dynamic bandwidth report is uploaded by using an overhead field in the primary PON uplink frame.

Optionally, the primary ONU uploads the data by using the primary ONU uplink frame. Such data includes: a primary PON user service from a local user, a secondary PON user services from a secondary PON, and secondary overhead from the secondary PON. The primary ONU encapsulates these three types of data by using an XGEM frame, and further forms a primary PON uplink frame by using the XGEM frame.

Optically, unlike data encapsulation by the primary ONU using the XGEM frame, the primary ONU uses the XGEM frame to encapsulate the primary PON user service data, as the standards specified. The primary ONU uses an XGEM frame to encapsulate all uplink GEM frames on one secondary ONU. The secondary PON user service data is encapsulated in the GEM frame. The primary ONU uses one XGEM frame to encapsulate all secondary PON overhead that needs to be forwarded by a secondary ONU to the nested OLT. As described in 1006, the secondary PON overhead that needs to be forwarded to the nested OLT refers to the secondary PON PLOAMu.

Optionally, the XGEM port number carried in the XGEM frame header is used to identify the content encapsulated in the XGEM frame. As specified in the standards, an uplink XGEM port number ranges from 0 to 65535. The XGEM port numbers that can be allocated as required ranges from 1023 to 65534, and purposes of other values have been specified in the standards. In this embodiment, the XGEM port numbers that can be allocated as required are categorized as follows: within the value range of 1023 to 65536, fixed port numbers equal to the total number of secondary ONUs in quantity are randomly selected, and these port numbers are used to identify the XGEM frames encapsulating the secondary PON user service data. In addition, these port numbers needs to correspond to the secondary ONUs in a one-to-one manner, so that the nested OLT can identify to which secondary ONU the user service data carried in an XGEM frame is to be sent. Similarly, within the value range of 1023 to 65534, fixed port numbers equal to the total number of secondary ONUs in quantity are randomly selected, and these port numbers are used to identify the XGEM frames encapsulating the secondary PON overhead. These port numbers also need to correspond to the secondary ONUs in a one-to-one manner, so that the nested OLT can identify to which secondary ONU the overhead carried in an XGEM frame is to be sent. Within the value range of 1023 to 65534, use method of other port numbers is as specified in the standards, and these port numbers are used to encapsulate the primary PON user service data.

According to the embodiments of the present disclosure, a plurality of XGEM frame encapsulation modes is provided. Persons of ordinary skill in the art may select one uniform or more different XGEM frame encapsulation modes according to actual requirements.

1009. The nested OLT parses the primary PON uplink frame to acquire the primary PON uplink user service data, the primary ONU uplink bandwidth request, the secondary Uplink user service data, and the second overhead, thereby formulating a new primary ONU uplink bandwidth grant for the primary ONU.

Optionally, the nested OLT sends the PON and secondary PON user service data to an upper-layer network.

Specifically, the nested OLT formulates a new primary ONU uplink bandwidth grant for the primary ONU according to primary PON available bandwidth resources, preconfiguration information set by the user service level agreement, and real-time state of the primary ONU uplink service traffic.

Specifically, the nested OLT receives, from the primary ONU side, primary PON uplink frames from different primary ONUs. Data type and data destination of the data carried in the XGEM frames are differentiated according to the port number of the XGEM frame.

In this embodiment, one or more primary ONUs may be deployed, one or more secondary ONUs may be deployed, and each primary ONU is connected to one or more secondary ONUs.

According to the method provided in this embodiment, the nested OLT and the primary ONU periodically formulate an uplink or downlink bandwidth grant for each T-CONT of the local, primary, and secondary ONUs according to real-time changes of uplink and downlink service traffic, service level agreement signed with a user, and current available bandwidth in the system. The primary ONU generates the primary PON uplink frame and the secondary PON downlink frame by using uplink and downlink bandwidth grants, uses the T-CONT type 5 cache to store the secondary PON uplink user service data, and attach importance to the cache by using configuration of the service descriptor. The primary ONU and the secondary ONU receive service data from a user side, and periodically reports, according to the real-time changes of the uplink traffic, a bandwidth request to each T-CONT where user service data having similar quality of service requirements is stored.

Figure 11:
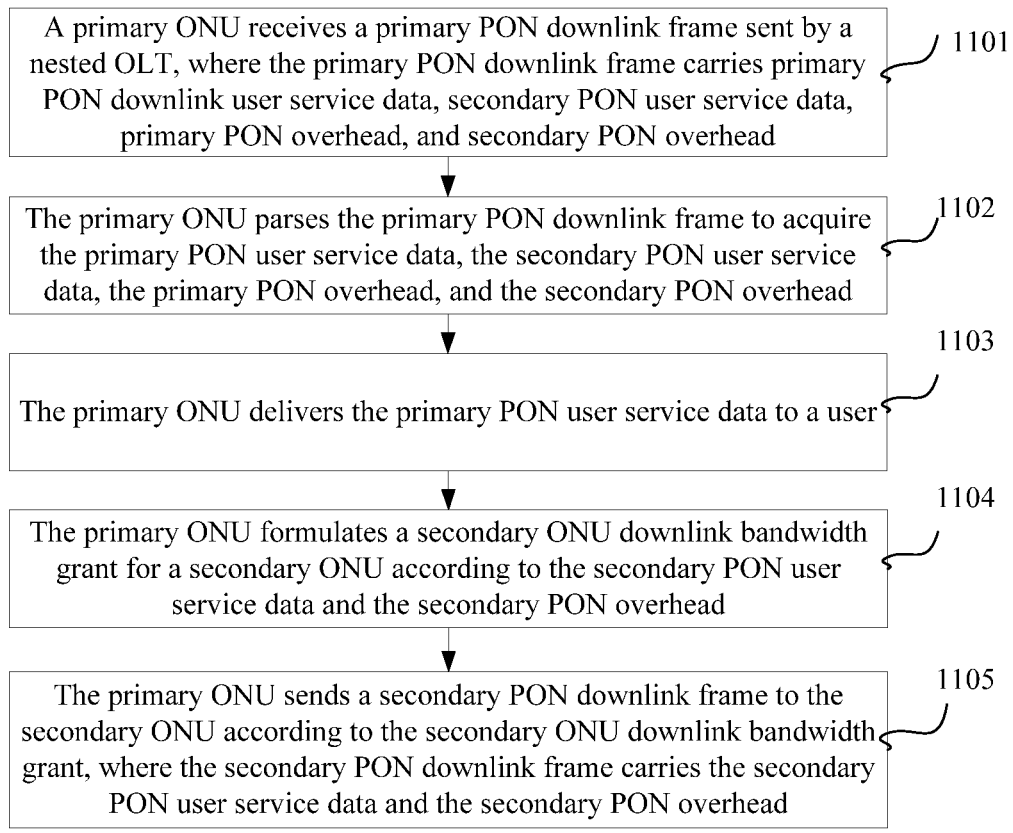
FIG. 11 is a flowchart of a method for allocating downlink bandwidth in a nested passive optical network according to an embodiment of the present disclosure.

FIG. 11 is a flowchart of a method for allocating downlink bandwidth in a nested passive optical network according to an embodiment of the present disclosure. This embodiment is based on the network structure illustrated in FIG. 1, and an executor in this embodiment is a primary ONU. Referring to FIG. 11, the method includes:

1101. A primary ONU receives a primary PON downlink frame sent by a nested OLT, where the primary PON downlink frame carries primary PON downlink user service data, secondary PON user service data, primary PON overhead, and secondary PON overhead.

1102. The primary ONU parses the primary PON downlink frame to acquire the primary PON user service data, the secondary PON user service data, the primary PON overhead, and the secondary PON overhead.

1103. The primary ONU delivers the primary PON user service data to a user;

1104. The primary ONU formulates a secondary ONU downlink bandwidth grant for a secondary ONU according to the secondary PON user service data and the secondary PON overhead.

1103 and 1104 are not order-sensitive. That is, 1103 may be performed first and then 1104 is performed; or 1104 may be performed first and then 1103 is performed; or 1103 and 1104 are performed simultaneously.

1105. The primary ONU sends a secondary PON downlink frame to the secondary ONU according to the secondary ONU downlink bandwidth grant, where the secondary PON downlink frame carries the secondary PON user service data and the secondary PON overhead.

In this embodiment, one or more primary ONUs may be deployed, one or more secondary ONUs may be deployed, and each primary ONU is connected to one or more secondary ONUs.

Figure 12:
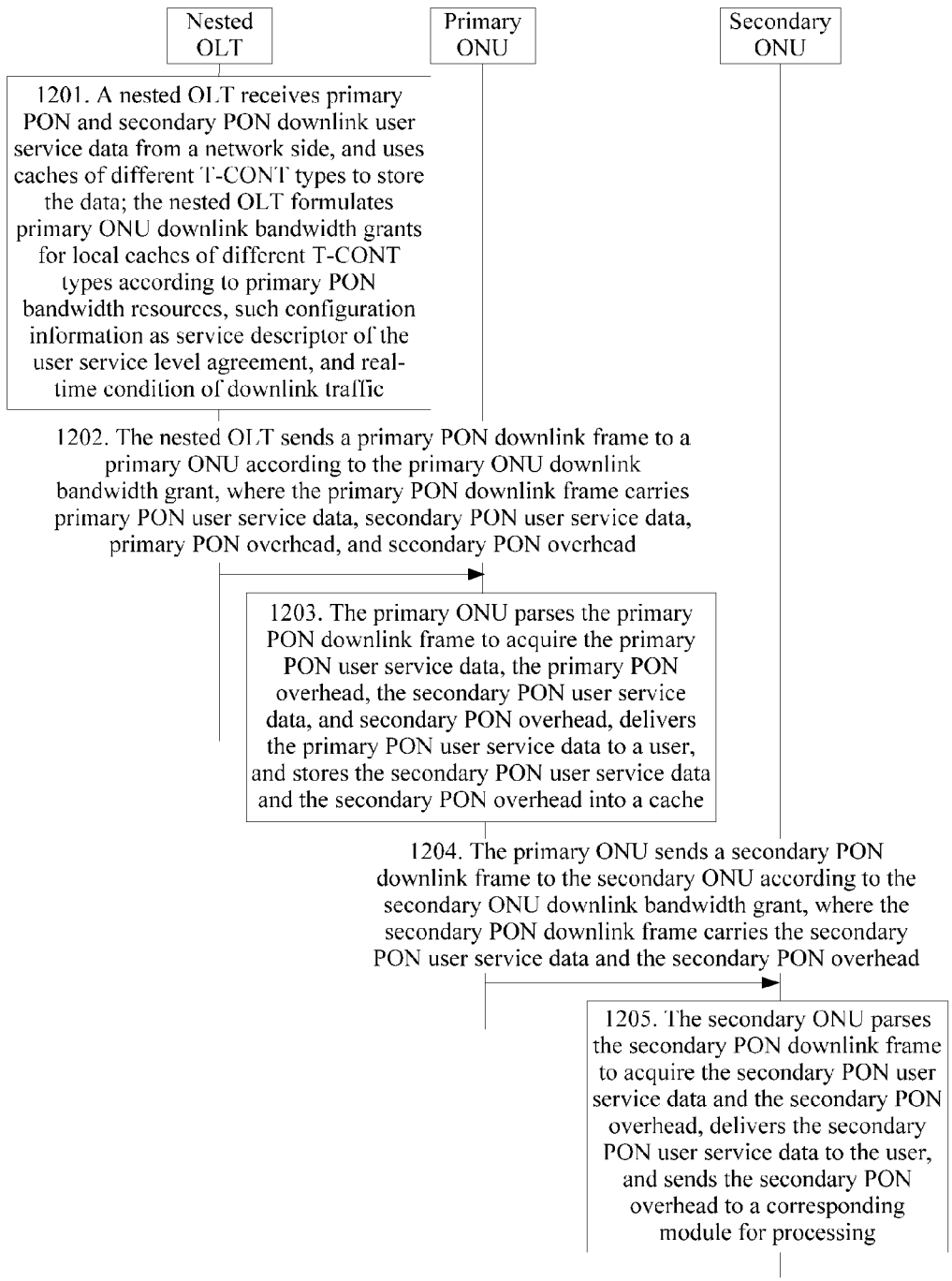
FIG. 12 is a flowchart of a method for allocating downlink bandwidth in a nested passive optical network according to an embodiment of the present disclosure.

FIG. 12 is a flowchart of a method for allocating downlink bandwidth in a nested passive optical network according to an embodiment of the present disclosure. This embodiment is based on the network structure illustrated in FIG. 1, and interaction subjects in this embodiment are a nested OLT, a primary ONU, and a secondary ONU. Referring to FIG. 12, the method includes:

1201. A nested OLT receives primary PON and secondary PON downlink user service data from a network side, and uses caches of different T-CONT types to store the data; the nested OLT formulates primary ONU downlink bandwidth grants for local caches of different T-CONT types according to primary PON bandwidth resources, such preconfiguration information as service descriptor of the user service level agreement, and real-time condition of downlink traffic.

When formulating the primary ONU downlink bandwidth grant, the nested OLT formulates only needs to ensure that all granted bandwidth of all primary ONUs do not exceed the total available bandwidth of the primary ONU, and it is unnecessary to ensure that the downlink data sent to a primary ONU does not exceed the total available bandwidth of a single secondary PON.

1202. The nested OLT sends a primary PON downlink frame to a primary ONU according to the primary ONU downlink bandwidth grant, where the primary PON downlink frame carries primary PON user service data, secondary PON user service data, primary PON overhead, and secondary PON overhead.

Specifically, by using the formulated primary ONU downlink bandwidth grant, the nested OLT extracts, from the local cache, the user service data to be delivered, and generates the secondary overhead to be sent to the secondary ONU. Then, the nested OLT encapsulates the user service data and the secondary PON overhead into an XGEM frame, and forms the primary PON downlink frame.

Optionally, the user service data and the secondary PON overhead are encapsulated into an XGEM frame by using the method described in 501. With respect to the primary PON user service data, a service data packet is mapped to an XGEM frame according to the standards, and the two least significant bits of an optional function field are set to binary digits 00. With respect to the secondary PON user service data, a service data packet is mapped to an XGEM frame according to the standards, and the four most significant bits of the XGEM port number in the XGEM frame header are set to the identifier of a target primary ONU, the 13 least significant bits thereof are set to a GEM port number of the service data packet, and the two least significant bits of the optional function field are set to binary digits 10. With respect to the secondary PON overhead, overhead of one secondary PON is all mapped to an XGEM frame, the four most significant bits of the XGEM port number in the XGEM frame header are set to the identifier of a target primary ONU, and the two least significant bits of the optional function field are set to binary digits 11. Generating and delivering the secondary PON overhead by the nested OLT refers to operation, maintenance and management of the downlink physical layer.

1203. The primary ONU parses the primary PON downlink frame to acquire the primary PON user service data, the primary PON overhead, the secondary PON user service data, and secondary PON overhead, delivers the primary PON user service data to a user, and stores the secondary PON user service data and the secondary PON overhead into a cache.

Optionally, the primary ONU formulates a secondary ONU downlink bandwidth grant according to a local cache. Specifically, the primary ONU formulates the secondary PON downlink bandwidth grant according to secondary PON available bandwidth resources, preconfiguration information set by the user service level agreement, and real-time occupancy of a local downlink cache.

Specifically, the primary ONU receives the primary ONU from the nested OLT, and parses out such primary PON overhead as the primary ONU bandwidth grant, and the XGEM frame. Then, according to the XGEM frame encapsulation method described in 1202, the primary PON user service data, the secondary PON service data, and the secondary PON overhead are parsed out from the XGEM frame. The primary PON service data is delivered to a local user, and caches of different T-CONT types are used to store the secondary PON service data. Service descriptors are configured for different T-CONTs, so that differentiated QoS assurance is provided for caches with different priorities; the secondary PON overhead is stored for delivery to the secondary ONU.

1204. The primary ONU sends a secondary PON downlink frame to the secondary ONU according to the secondary ONU downlink bandwidth grant, where the secondary PON downlink frame carries the secondary PON user service data and the secondary PON overhead.

Specifically, the primary ONU extracts the service data by using the downlink bandwidth grant, uses a GEM frame to encapsulate the secondary PON service data as required in the standards, and generates the secondary PON downlink frame by using the received and generated secondary PON overhead.

Optionally, all overhead needed for the primary ONU to generate the secondary PON downlink frame includes a physical synchronization field, an identifier field, downlink physical layer operation maintenance and management overhead, a bit interleaved parity code field, a downlink payload length field, and a bandwidth mapping table. Except that the downlink physical layer operation maintenance and management overhead is acquired from the nested OLT, the other overhead all generated by the primary ONU.

1205. The secondary ONU parses the secondary PON downlink frame to acquire the secondary PON user service data and the secondary PON overhead, delivers the secondary PON user service data to the user, and sends the secondary PON overhead to a corresponding module for processing.

Persons skilled in the art well know that different overhead is sent to different modules for processing. For example, an uplink bandwidth grant is sent to a framing or scheduling module, for sending an uplink frame.

In this embodiment, one or more primary ONUs may be deployed, one or more secondary ONUs may be deployed, and each primary ONU is connected to one or more secondary ONUs.

The method provided in the present disclosure is applicable to PON networks nested using two TDM PON standards. The main change lies in that the formats of overhead carrying such information as bandwidth request and bandwidth grant are different. That is, the overhead may be located in the frame, or may be an independent overhead frame. The format of a frame carries the uplink and downlink service data may vary. In addition, the object or granularity of bandwidth allocation may be an ONU, but not necessarily a T-CONT in the ONU.

In the foregoing embodiment, the nested OLT is mainly responsible for operating, maintaining and managing the entire PON; the primary ONU is mainly responsible for converting frame formats between two stages of PONs, and is also responsible for operating, maintaining and managing the secondary PON; and the secondary ONU is responsible for receiving downlink data, and completing uplink transmission according to the uplink grant. The method, device, and nested system for allocating uplink and downlink bandwidth in a nested passive optical network provided in the embodiments of the present disclosure are capable of achieving an optimal overall performance for the two stages of PONs by considering general conditions of the two stages of PONs. During formulation of a bandwidth grant, the maximum available bandwidth of the two stages of PONs is considered, which ensures that uplink and downlink service data does not remain long in the primary ONU. The service data that reaches the primary ONU by occupying bandwidth resources of a previous stage of PON may take precedence to reaches through a next stage of PON to reach a final destination device.

Figure 13:
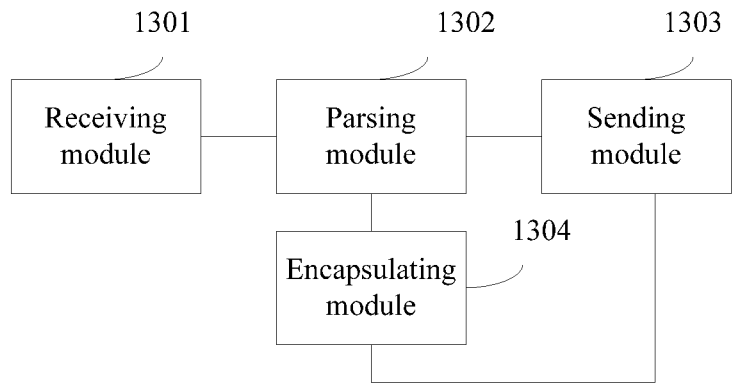
FIG. 13 is a schematic structural diagram of an optical network unit according to an embodiment of the present disclosure.

FIG. 13 is a schematic structural diagram of an optical network unit according to an embodiment of the present disclosure. The optical network unit is responsible for implementing functions of a physical medium adaptation layer and a transport convergence layer on a primary PON, is configured to receive optical signals from a primary ODN, generate electrical signals, or convert the received electrical signals into optical signals and transmit the same to the primary ODN. Additionally, the optical network unit is responsible for implementing functions of a physical medium adaptation layer of a secondary PON, and is configured to receive optical signals, generate electrical signals or convert the received optical signal into optical signals and transmit the same to the secondary ODN, and is additionally responsible for implementing functions such as framing, medium access control, operation maintenance management, and bandwidth allocation.

Referring to FIG. 13, the optical network unit may serves as a primary ONU, where the ONU includes: a receiving module 1301, a parsing module 1302, and a sending module 1303.

The receiving module 1301 is configured to receive a primary PON downlink frame sent by a nested OLT, where the primary PON downlink frame carries a primary ONU uplink bandwidth grant and a secondary ONU uplink bandwidth grant.

The parsing module 1302 is configured to parse the primary PON downlink frame to acquire the primary ONU uplink bandwidth grant and the secondary ONU uplink bandwidth grant.

The sending module 1303 is configured to send at least one PON downlink frame to at least one secondary ONU, where the at least one secondary PON downlink frame carries the acquired secondary ONU uplink bandwidth grant.

Specifically, in this embodiment, by using the receiving module 1301 and the parsing module 1302, the optical network unit is responsible for receiving and parsing the primary PON downlink frame to acquire the primary ONU uplink bandwidth grant, the secondary ONU uplink bandwidth grant, the secondary PON overhead needed for generating the secondary PON downlink frame, and the secondary PON user service data; and receiving and parsing the secondary PON uplink frame to acquire the secondary PON service data and such secondary PON overhead as the secondary ONU uplink bandwidth request.

Optionally, the optical network unit may further include an encapsulating module 1304.

The encapsulating module 1304 is configured to: receive at least one secondary PON uplink frame sent by at least one secondary ONU, where the secondary PON uplink frame carries a secondary ONU bandwidth request; and encapsulate the secondary ONU bandwidth request into a primary PON uplink frame. Understandably, according to the primary ONU uplink bandwidth grant, the encapsulating module 1304 uses an entire primary PON uplink frame to carry the overhead-simplified secondary PON uplink frame carrying the secondary ONU uplink bandwidth request.

The sending module 1303 is further configured to send the primary PON uplink frame to the nested OLT, so that the nested OLT formulates a new primary ONU uplink bandwidth grant for the primary ONU according to the primary PON uplink frame, and formulates at least one new secondary ONU uplink bandwidth grant for the at least one secondary ONU.

In this embodiment, the encapsulating module 1304 is responsible for using the acquired secondary PON overhead and service data to form a secondary PON downlink frame.

Optionally, an overhead field in the primary PON downlink frame carries the primary ONU uplink bandwidth grant, and a payload field in the primary PON downlink frame carries the secondary ONU uplink bandwidth grant.

In this embodiment, one or more primary ONUs may be deployed, one or more secondary ONUs may be deployed, and each primary ONU is connected to one or more secondary ONUs.

Figure 14:
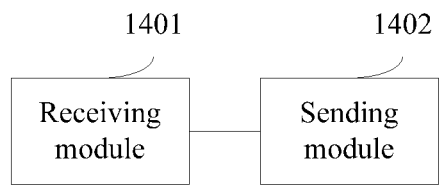
FIG. 14 is a schematic structural diagram of an optical network unit according to an embodiment of the present disclosure.

FIG. 14 is a schematic structural diagram of an optical network unit according to an embodiment of the present disclosure. The optical network unit is responsible for implementing functions of a physical medium adaptation layer and a transport convergence layer on a secondary PON, is configured to receive optical signals, generate electrical signals, or convert the received electrical signals into optical signals and transmit the same to a secondary ODN, and is additionally responsible for implementing functions such as framing, media access control, operation maintenance management, dynamic bandwidth allocation, and frame format conversion between a user service interface and a transport convergence layer interface on the secondary PON. Referring to FIG. 14, the optical network unit serves as a secondary optical network unit, and includes a receiving module 1401 and a sending module 1402.

The receiving module 1401 is configured to receive a secondary PON downlink frame sent by a primary ONU, where the secondary PON downlink frame carries a secondary ONU uplink bandwidth grant.

The sending module 1042 is configured to send a secondary PON uplink frame to the primary ONU according to the received secondary ONU uplink bandwidth grant, where the secondary PON uplink frame carries the secondary ONU uplink bandwidth request.

In the optical network unit according to this embodiment, the receiving module receives the secondary PON downlink frame from the secondary PON side and parses the secondary PON downlink frame to acquire the secondary ONU uplink bandwidth grant and secondary PON downlink user service data, and further receives secondary PON uplink user service data from the user side; and the sending module 1402 sends the secondary PON uplink frame at a specified time pint according to an uplink bandwidth grant.

The sending module 1402 is specifically configured to use, according to the secondary ONU uplink bandwidth grant, a secondary PON uplink frame to carry such overhead as the secondary PON uplink user service data and the secondary ONU uplink bandwidth request.

In addition, the optical network unit is further configured to converge uplink service data uploaded by a user, and distribute downlink user service data parsed from the secondary PON downlink frame.

In this embodiment, one or more primary ONUs may be deployed, one or more secondary ONUs may be deployed, and each primary ONU is connected to one or more secondary ONUs.

Figure 15:
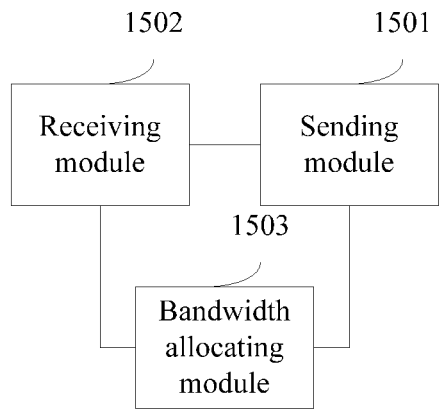
FIG. 15 is a schematic structural diagram of an optical line terminal device according to an embodiment of the present disclosure.

FIG. 15 is a schematic structural diagram of an optical line terminal according to an embodiment of the present disclosure. The optical line terminal is responsible for implementing functions of a physical medium adaptation layer and a transport convergence layer of a primary PON, and is configured to receive optical signals from a primary ODN, generate electrical signals or convert the received electrical signals into optical signals and transmit the optical signals to the primary ODN. In addition, the optical line terminal is responsible for implementing functions such as framing, media access control, operation maintenance management, and bandwidth allocation.

Referring to FIG. 15, the optical line terminal includes: a sending module 1501, a receiving module 1502, and a bandwidth allocating module 1503.

The sending module 1501 is configured to send a primary PON downlink frame to a primary ONU, where the primary PON downlink frame carries a primary ONU and secondary ONU uplink bandwidth grants.

The receiving module 1502 is configured to receive a primary PON uplink frame sent by the primary ONU.

The receiving module 1502 is further configured to receive primary ONU downlink user service data and/or secondary ONU downlink user service data.

The bandwidth allocating module 1503 is configured to formulate a new secondary ONU uplink bandwidth grant for the secondary ONU according to the primary PON uplink frame.

The bandwidth allocating module 1503 is further configured to formulate a new primary ONU uplink bandwidth grant for the primary ONU according to the new secondary ONU uplink bandwidth grant formulated for the secondary ONU.

Specifically, the bandwidth allocating module 1503 is configured to: parse the primary PON uplink frame to acquire uplink user service data, a primary ONU uplink bandwidth request and/or a secondary ONU uplink bandwidth request; and formulate a new ONU uplink bandwidth grant and a new secondary ONU uplink bandwidth grant according to available bandwidth resources, user service level agreement, and real-time uplink bandwidth requests. In this embodiment, the optical line terminal is configured to formulate a new primary ONU uplink bandwidth grant for the primary ONU and a new secondary ONU uplink bandwidth grant for the secondary ONU; whereas in another embodiment, the optical line terminal may further formulate a new primary ONU uplink bandwidth grant for the primary ONU only.

Optionally, the optical line terminal converts frame formats between a user service interface, a primary PON transport convergence layer interface, and a secondary PON transport convergence layer interface.

In this embodiment, one or more primary ONUs may be deployed, one or more secondary ONUs may be deployed, and each primary ONU is connected to one or more secondary ONUs.

Figure 16:
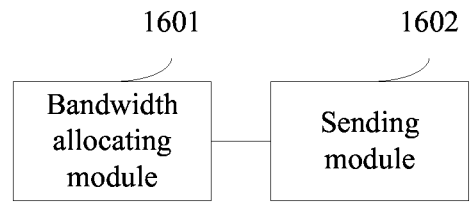
FIG. 16 is a schematic structural diagram of an optical line terminal device according to an embodiment of the present disclosure.

FIG. 16 is a schematic structural diagram of an optical line terminal according to an embodiment of the present disclosure. Referring to FIG. 16, the optical line terminal includes: a bandwidth allocating module 1601 and a sending module 1602.

The bandwidth allocating module 1601 is configured to formulate a primary ONU downlink bandwidth grant; and The sending module 1602 is configured to send a primary PON downlink frame to a primary ONU according to the primary ONU downlink bandwidth grant, where the primary PON downlink frame carries secondary PON downlink user service data, primary PON overhead, and secondary PON overhead, so that the primary ONU parses the primary PON downlink frame to acquire the secondary PON downlink user service data, the primary PON overhead, and the secondary PON overhead. The optical line terminal according to this embodiment is responsible for formulate a downlink bandwidth grant according to available bandwidth resources, user service level agreement, and real-time occupancy of local caches, and sending a primary PON downlink frame to a primary ONU according to the downlink bandwidth grant.

In this embodiment, one or more primary ONUs may be deployed, one or more secondary ONUs may be deployed, and each primary ONU is connected to one or more secondary ONUs.

Figure 17:
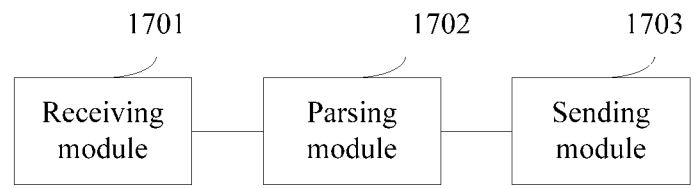
FIG. 17 is a schematic structural diagram of an optical network unit according to an embodiment of the present disclosure.

FIG. 17 is a schematic structural diagram of an optical network unit according to an embodiment of the present disclosure. The optical network unit is responsible for implementing functions of a physical medium adaptation layer and a transport convergence layer on a primary PON, is configured to receive optical signals from a primary ODN, generate electrical signals, or convert the received electrical signals into optical signals and transmit the same to the primary ODN, and is additionally responsible for implementing functions such as framing, medium access control, operation maintenance management, dynamic bandwidth allocation, and frame format conversion between a user service interface and a transport convergence layer interface on the primary and secondary PONs. Referring to FIG. 17, the optical network unit includes: a receiving module 1701, a parsing module 1702, and a sending module 1703.

The receiving module 1701 is configured to receive a primary PON downlink frame sent by a nested OLT, where the primary PON downlink frame carries secondary PON downlink user service data, primary PON overload, and secondary PON overhead.

The parsing module 1702 is configured to parse the primary PON downlink frame to acquire the secondary PON downlink user service data, the primary PON overhead, and the secondary PON overhead.

The sending module 1703 is configured to send a secondary PON downlink frame to a secondary ONU, where the secondary PON downlink frame carries the secondary PON downlink user service data and the secondary PON overhead.

The optical network unit according to this embodiment receives a primary PON downlink frame from a PON side; parses the same to acquire such overhead as primary PON user service data and a primary ONU uplink bandwidth grant, secondary PON user service data and overhead thereof; and send a secondary PON downlink frame to a secondary ONU. In addition, the sending module 703 further sends the primary PON uplink frame at a specified time point according to the primary ONU uplink bandwidth grant.

In this embodiment, one or more primary ONUs may be deployed, one or more secondary ONUs may be deployed, and each primary ONU is connected to one or more secondary ONUs.

Figure 18:
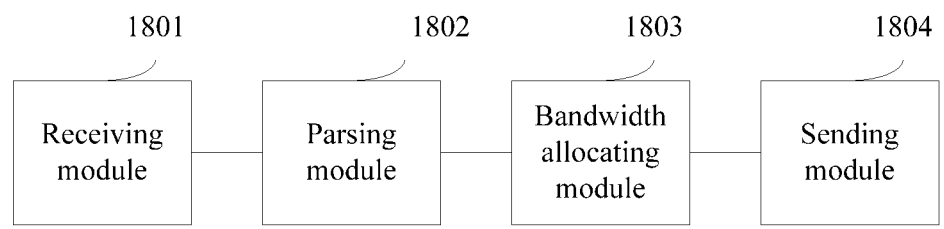
FIG. 18 is a schematic structural diagram of an optical network unit according to an embodiment of the present disclosure.

FIG. 18 is a schematic structural diagram of an optical network unit according to an embodiment of the present disclosure. The optical network unit converges uplink service data uploaded by a secondary PON and a local user, and distributes downlink user service data parsed from a primary PON downlink frame and service data to be sent to a secondary PON; and is responsible for implementing functions of a physical medium adaptation layer and a transport convergence layer of the secondary PON, and is configured to receive optical signals, generate electrical signals or convert the received electrical signals into optical signals and transmit the optical signals to a secondary ODN.

Referring to FIG. 18, the optical network unit includes: a receiving module 1801, a parsing module 1802, a bandwidth allocating module 1803, and a sending module 1804.

The receiving module 1801 is configured to receive a primary PON downlink frame sent by a nested OLT, and send a secondary PON downlink frame to a secondary ONU, where the primary PON downlink frame carries a primary ONU uplink bandwidth grant and the secondary PON downlink frame carries a secondary ONU uplink bandwidth grant.

The parsing module 1802 is configured to parse the primary PON downlink frame to acquire the primary ONU uplink bandwidth grant.

The receiving module 1801 is further configured to receive primary PON uplink user service data and a secondary PON uplink frame sent by a secondary ONU, where the secondary PON uplink frame carries secondary PON uplink user service data, secondary ONU uplink bandwidth request, and secondary PON overhead.

The parsing module 1802 is further configured to parse the secondary PON uplink frame to acquire the secondary PON uplink user service data, the secondary ONU uplink bandwidth request, and the secondary PON overhead.

The bandwidth allocating module 1803 is configured to formulate a new secondary ONU uplink bandwidth grant for the secondary ONU according to the acquired secondary ONU uplink bandwidth request.

Specifically, the bandwidth allocating module 1803 is responsible for formulating a new secondary ONU uplink bandwidth grant for the secondary ONU according to such information as available bandwidth resources, user service level agreement of the secondary PON and the uplink dynamic bandwidth request of the secondary ONU.

The sending module 1804 is configured to send a primary PON uplink frame to the nested OLT, where the primary PON uplink frame carries the primary PON uplink user service data, primary ONU uplink bandwidth request, the secondary PON uplink user service data, and the secondary PON overhead, so that the nested OLT parses the primary PON uplink frame to acquire the primary PON uplink user service data, the primary ONU uplink bandwidth request, the secondary PON uplink user service data, and the secondary PON overhead, thereby formulating a new primary ONU uplink bandwidth grant for the primary ONU.

The sending module 1804 is responsible for using, according to a secondary PON downlink bandwidth grant, the secondary PON downlink frame to carry such overhead as the secondary ONU uplink bandwidth grant and the secondary PON user data; and is responsible for using, according to the primary ONU uplink bandwidth grant, the primary PON uplink frame to carry the primary PON user service data, such overhead as the primary ONU uplink bandwidth request, and the secondary PON user service data and overhead thereof.

In this embodiment, one or more primary ONUs may be deployed, one or more secondary ONUs may be deployed, and each primary ONU is connected to one or more secondary ONUs.

Figure 19:
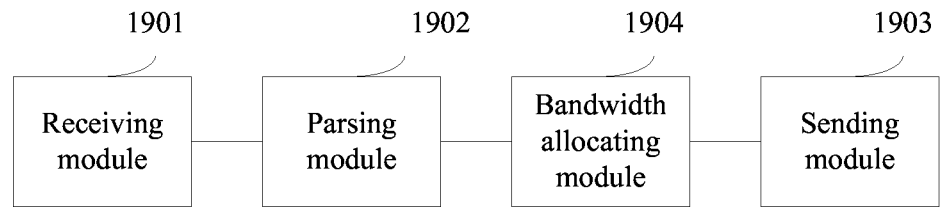
FIG. 19 is a schematic structural diagram of an optical network unit according to an embodiment of the present disclosure.

FIG. 19 is a schematic structural diagram of an optical network unit according to an embodiment of the present disclosure. Referring to FIG. 19, the optical network unit includes: a receiving module 1901, a parsing module 1902, a sending module 1903, and a bandwidth allocating module 1904.

The receiving module 1901 is configured to receive a primary PON downlink frame sent by a nested OLT, where the primary PON downlink frame carries primary PON downlink user service data, secondary PON user service data, primary PON overhead, and secondary PON overhead.

The parsing module 1902 is configured to parse the primary PON downlink frame to acquire the primary PON user service data, the secondary PON user service data, the primary PON overhead, and the secondary PON overhead.

Optionally, the optical network unit stores the secondary PON user service data and the secondary PON overhead into a local cache.

The sending module 1903 is configured to deliver the primary PON user service data to a user.

The bandwidth allocating module 1904 is configured to formulate a secondary ONU downlink bandwidth grant according to the secondary PON user service data and the secondary PON overhead.

Specifically, the bandwidth allocating module 1904 is responsible for formulating a secondary ONU downlink bandwidth grant according to secondary PON available bandwidth resources, such preconfiguration information as user service level agreement, and such real-time downlink bandwidth demands as locally cached secondary PON user service data and secondary PON overhead.

The sending module 1903 is configured to send a secondary PON downlink frame to a secondary ONU according to the secondary ONU downlink bandwidth grant, where the secondary PON downlink frame carries the secondary PON user service data and the secondary PON overhead.

In this embodiment, one or more primary ONUs may be deployed, one or more secondary ONUs may be deployed, and each primary ONU is connected to one or more secondary ONUs.

Figure 20:
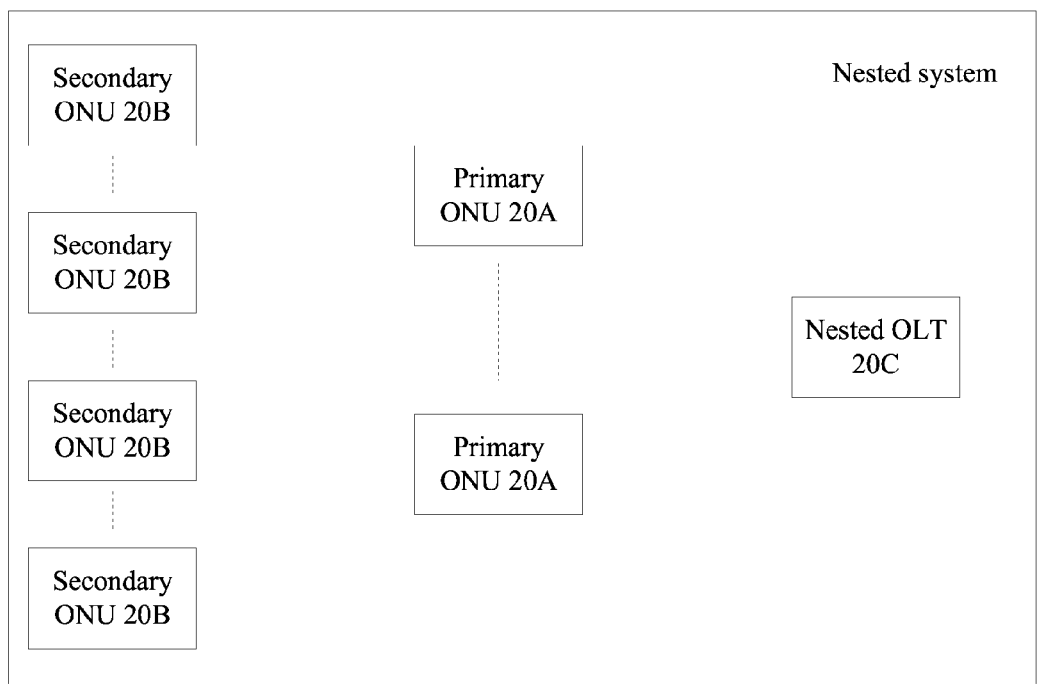
FIG. 20 is a schematic structural diagram of a nested system according to an embodiment of the present disclosure.

FIG. 20 is a schematic structural diagram of a nested system according to an embodiment of the present disclosure. The nested system includes: one or more primary ONUs 20A, a nested OLT 20C, and one or more secondary ONUs 20B.

The primary ONU is configured to: receive a primary PON downlink frame sent by a nested OLT, where the primary PON downlink frame carries a primary ONU uplink bandwidth grant and a secondary ONU uplink bandwidth grant; parse the primary PON downlink frame to acquire the primary ONU uplink bandwidth grant and the secondary ONU uplink bandwidth grant; and send a secondary PON downlink frame to a secondary ONU, where the secondary PON downlink frame carries the acquired secondary ONU uplink bandwidth grant.

Optionally, the primary ONU is further configured to: receive a primary PON downlink frame sent by a nested OLT, where the primary PON downlink frame carries secondary PON downlink user service data, primary PON overhead, and secondary PON overhead; parse the primary PON downlink frame to acquire the secondary PON downlink user service data, primary PON overhead, and secondary PON overhead; and send a secondary PON downlink frame to a secondary ONU, where the secondary PON downlink frame carries the secondary PON downlink user service data and the secondary PON overhead.

The secondary ONU is configured to receive a secondary PON downlink frame sent by a primary ONU, where the secondary PON downlink frame carries a secondary ONU uplink bandwidth grant; the secondary ONU sends a secondary PON uplink frame to the primary ONU according to the received secondary ONU uplink bandwidth grant, where the secondary PON uplink frame carries the secondary ONU uplink bandwidth request.

The nested OLT is configured to: send a primary PON downlink frame to a primary ONU, where the primary PON downlink frame carries primary ONU and secondary ONU uplink bandwidth grants; receive a primary PON uplink frame sent by the primary ONU; formulate a new secondary ONU uplink bandwidth grant for the secondary ONU according to the primary PON uplink frame; and formulate a new primary ONU uplink bandwidth grant for the primary ONU according to the new secondary ONU uplink bandwidth grant formulated for the secondary ONU.

Optionally, in the nested system, the nested OLT is further configured to send a primary PON downlink frame to a primary ONU according to a downlink bandwidth grant, where the primary PON downlink frame carries secondary PON downlink user service data, primary PON overhead, and secondary PON overhead, so that the primary ONU parses the primary PON downlink frame to acquire the secondary PON downlink user service data, the primary PON overhead, and the secondary PON overhead.

In this embodiment, one or more primary ONUs may be deployed, one or more secondary ONUs may be deployed, and each primary ONU is connected to one or more secondary ONUs.

In the foregoing embodiment, the nested OLT is mainly responsible for operating, maintaining and managing the primary ONU and the secondary ONU in the entire PON; the primary ONU is mainly responsible for converting frame formats between two stages of PONs; and the secondary ONU is responsible for receiving downlink data, and completing uplink transmission according to the uplink grant. The nesting system according to the embodiments of the present disclosure achieves an optimal overall performance for the two stages of PONs by considering general conditions of the two stages of PONs. During formulation of a bandwidth grant, the maximum available bandwidth of the two stages of PONs is considered, which ensures that uplink and downlink service data does not remain long in the primary ONU. The service data that reaches the primary ONU by occupying bandwidth resources of a previous stage of PON may take precedence to reaches through a next stage of PON to reach a final destination device.

Figure 21:
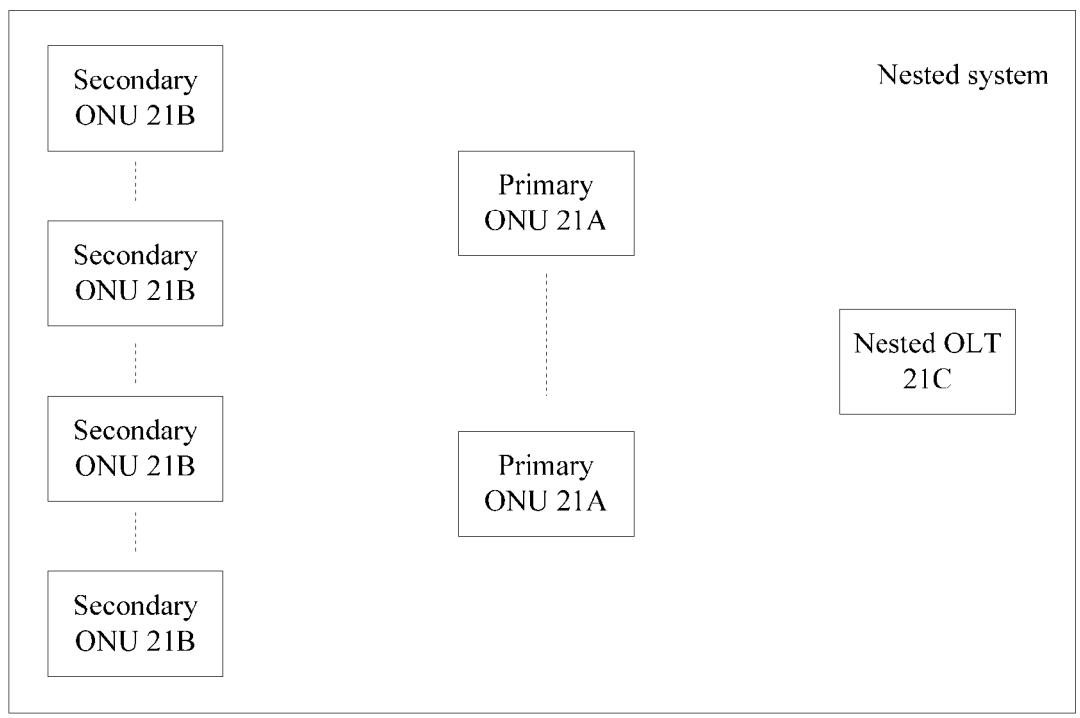
FIG. 21 is a schematic structural diagram of another nested system according to an embodiment of the present disclosure.

FIG. 21 is a schematic structural diagram of another nested system according to an embodiment of the present disclosure. The nested system includes: one or more primary ONUs 21A, one or more secondary ONUs 21B, and a nested OLT 21C.

The primary ONU is configured to: receive a primary PON downlink frame sent by a nested OLT, and send a secondary PON downlink frame to a secondary ONU, where the primary PON downlink frame carries a primary ONU uplink bandwidth grant and the secondary PON downlink frame carries a secondary ONU uplink bandwidth grant; parse the primary PON downlink frame to acquire the primary ONU uplink bandwidth grant; receive primary PON uplink user service data; receive a secondary PON uplink frame sent by a secondary ONU, where the secondary PON uplink frame carries secondary PON uplink user service data, a secondary ONU uplink bandwidth request, and secondary PON overhead; parses the secondary PON uplink frame to acquire the secondary PON uplink user service data, the secondary ONU uplink bandwidth request, and the secondary PON overhead, and formulate a new secondary ONU uplink bandwidth grant for the secondary ONU according to the acquired secondary ONU uplink bandwidth request; send a primary PON uplink frame to the nested OLT, where the primary PON uplink frame carries the primary PON uplink user service data, a primary ONU uplink bandwidth request, the secondary PON uplink user service data, and the secondary PON overhead, so that the nested OLT parses the primary PON uplink frame to acquire the primary PON uplink user service data, the primary ONU uplink bandwidth request, the secondary PON uplink user service data, and the secondary PON overhead, thereby formulating a new primary ONU uplink bandwidth grant for the primary ONU.

Optionally, the primary ONU is further configured to: receive a primary PON downlink frame sent by a nested OLT, where the primary PON downlink frame carries primary PON and secondary PON user service data, and primary PON and secondary PON overhead; parse the primary PON downlink frame to acquire the primary PON and secondary PON user service data, and the primary PON and secondary PON overhead; deliver the primary PON user service data to a user; formulate a new secondary ONU downlink bandwidth grant according to the secondary PON user service data and the secondary PON overhead; and send a secondary PON downlink frame to a secondary ONU according to the new secondary ONU downlink bandwidth grant, where the secondary PON downlink frame carries the secondary PON user service data and the secondary PON overhead.

The secondary ONU is configured to receive a secondary PON downlink frame sent by a primary ONU, where the secondary PON downlink frame carries a secondary ONU uplink bandwidth grant; the secondary ONU sends a secondary PON uplink frame to the primary ONU according to the received secondary ONU uplink bandwidth grant, where the secondary PON uplink frame carries the secondary ONU uplink bandwidth request.

The nested OLT is configured to operate, maintain, and manage the primary ONU and the secondary ONU.

In this embodiment, one or more primary ONUs may be deployed, one or more secondary ONUs may be deployed, and each primary ONU is connected to one or more secondary ONUs.

Persons of ordinary skill in the art may understand that all or a part of the steps in the foregoing embodiments may be implemented by a program instructing relevant hardware. The program may be stored in a computer readable storage medium. The storage medium may be a read-only memory, a magnetic disk, or an optical disc.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for allocating downlink bandwidth in a nested passive optical network (PON), comprising:
  receiving, by a primary optical network unit (ONU), a primary PON downlink frame from a nested optical line terminal (OLT), wherein the primary PON downlink frame carries primary PON downlink user service data, secondary PON user service data, primary PON overhead, and secondary PON overhead;
  parsing, by the primary ONU, the primary PON downlink frame to acquire the primary PON user service data, the secondary PON user service data, the primary PON overhead, and the secondary PON overhead;
  delivering, by the primary ONU, the primary PON user service data to a user;
  formulating, by the primary ONU, a secondary ONU downlink bandwidth grant according to the secondary PON user service data and the secondary PON overhead; and
  sending, by the primary ONU, a secondary PON downlink frame to a secondary ONU according to the secondary ONU downlink bandwidth grant, wherein the secondary PON downlink frame carries the secondary PON user service data and the secondary PON overhead.

2. A method for allocating uplink bandwidth in a nested passive optical network (PON), comprising:
  receiving, by a primary optical network unit (ONU), a primary PON downlink frame sent by a nested optical line terminal (OLT), and sending a secondary PON downlink frame to a secondary ONU, wherein the primary PON downlink frame carries a primary ONU uplink bandwidth grant and the secondary PON downlink frame carries a secondary ONU uplink bandwidth grant;
  parsing, by the primary ONU, the primary PON downlink frame to acquire the primary ONU uplink bandwidth grant;
  receiving, by the primary ONU, primary PON uplink user service data;
  receiving, by the primary ONU, a secondary PON uplink frame sent by a secondary ONU, wherein the secondary PON uplink frame carries secondary PON uplink user service data, secondary ONU uplink bandwidth request, and secondary PON overhead;
  parsing, by the primary ONU, the secondary PON uplink frame to acquire the secondary PON uplink user service data, the secondary ONU uplink bandwidth request, and the secondary PON overhead, and formulating a new secondary ONU uplink bandwidth grant for the secondary ONU according to the secondary ONU uplink bandwidth request acquired; and
  sending, by the primary ONU, a primary PON uplink frame to the nested OLT, wherein the primary PON uplink frame carries the primary PON uplink user service data, primary ONU uplink bandwidth request, the secondary PON uplink user service data, and the secondary PON overhead.

3. An optical network unit (ONU), comprising:

a receiving module, configured to receive a primary passive optical network (PON) downlink frame sent by a nested optical line terminal (OLT), and send a secondary PON downlink frame to a secondary ONU, wherein the primary PON downlink frame carries a primary ONU uplink bandwidth grant and the secondary PON downlink frame carries a secondary ONU uplink bandwidth grant; and a parsing module, configured to parse the primary PON downlink frame to acquire the primary ONU uplink bandwidth grant;

wherein the receiving module is further configured to receive primary PON uplink user service data;

the receiving module is further configured to receive a secondary PON uplink frame sent by a secondary ONU, wherein the secondary PON uplink frame carries secondary PON uplink user service data, secondary ONU uplink bandwidth request, and secondary PON overhead; and the parsing module is further configured to: parse the secondary PON uplink frame to acquire the secondary PON uplink user service data, the secondary ONU uplink bandwidth request, and the secondary PON overhead; and formulate a new secondary ONU uplink bandwidth grant for the secondary ONU according to the secondary ONU uplink bandwidth request acquired; and a sending module, configured to send a primary PON uplink frame to the nested OLT, wherein the primary PON uplink frame carries the primary PON uplink user service data, primary ONU uplink bandwidth request, the secondary PON uplink user service data, and the secondary PON overhead.

4. An optical network unit (ONU), comprising:

a receiving module, configured to receive a primary passive optical network (PON) downlink frame sent by a nested optical line terminal (OLT), wherein the primary PON downlink frame carries primary PON downlink user service data, secondary PON user service data, primary PON overhead, and secondary PON overhead;

a parsing module, configured to parse the primary PON downlink frame to acquire the primary PON user service data, the secondary PON user service data, the primary PON overhead, and the secondary PON overhead;

a sending module, configured to deliver the primary PON user service data to a user; and a bandwidth allocating module, configured to formulate a secondary ONU downlink bandwidth grant according to the secondary PON user service data and the secondary PON overhead;

wherein the sending module is configured to send a secondary PON downlink frame to a secondary ONU according to the secondary ONU downlink bandwidth grant, wherein the secondary PON downlink frame carries the secondary PON user service data and the secondary PON overhead.

* * * * *